United States Patent
Sedlak

(10) Patent No.: US 12,046,954 B2
(45) Date of Patent: Jul. 23, 2024

(54) ELECTRIC MOTOR WITH DIFFERENT STAR POINTS

(71) Applicant: Efficient Energy GmbH, Feldkirchen (DE)

(72) Inventor: Holger Sedlak, Lochhofen / Sauerlach (DE)

(73) Assignee: VERTIV S.R.L., Piove di Sacco (IT)

( * ) Notice: Subject to any disclaimer, the term of this patent is extended or adjusted under 35 U.S.C. 154(b) by 386 days.

(21) Appl. No.: 17/350,436

(22) Filed: Jun. 17, 2021

(65) Prior Publication Data
US 2021/0313854 A1 Oct. 7, 2021

Related U.S. Application Data

(63) Continuation of application No. PCT/EP2018/086397, filed on Dec. 20, 2018.

(51) Int. Cl.
*H02P 6/16* (2016.01)
*H02K 1/14* (2006.01)
(Continued)

(52) U.S. Cl.
CPC .......... *H02K 1/2795* (2022.01); *H02K 1/148* (2013.01); *H02K 1/276* (2013.01); *H02K 3/18* (2013.01);
(Continued)

(58) Field of Classification Search
CPC ...... H02K 1/2795; H02K 1/148; H02K 1/279; H02K 3/18; H02K 3/28; H02K 3/522; H02K 7/09; H02P 6/16; H02P 23/14
See application file for complete search history.

(56) References Cited

U.S. PATENT DOCUMENTS 6,392,905 B1 * 5/2002 Huang .................... H02P 25/22
318/705
8,487,497 B2 * 7/2013 Taniguchi .............. H02K 21/14
310/179
(Continued)

FOREIGN PATENT DOCUMENTS

DE   10 2011 013885 A1   9/2012
DE   10 2013 009776 A1   1/2014
(Continued)

OTHER PUBLICATIONS

International Search Report and Written Opinion dated Jul. 30, 2019, issued in application No. PCT/EP2018/086397.
(Continued)

*Primary Examiner* — Rina I Duda
(74) *Attorney, Agent, or Firm* — McClure, Qualey & Rodack, LLP

(57) ABSTRACT

An electric motor includes: a rotor with a first number of permanent magnets, wherein each permanent magnet encompasses a first circular sector; a stator with a second number of pole feet, wherein a first group of coils is electrically connected via a first star point, wherein a second group of coils is electrically connected via a second star point to be conductive, wherein the second star point is electrically insulated from the first star point, wherein a coil of the first group of coils is arranged between two coils of the second group of coils; and a controller for applying drive signals to the first group of coils so as to provide the rotor with a torque with respect to the stator, and for applying a control signal that differs from the drive signals to at least one coil of the second group of coils.

20 Claims, 12 Drawing Sheets

(51) Int. Cl.
| | |
|---|---|
| *H02K 1/276* | (2022.01) |
| *H02K 1/2795* | (2022.01) |
| *H02K 3/18* | (2006.01) |
| *H02K 3/28* | (2006.01) |
| *H02K 3/52* | (2006.01) |
| *H02K 7/09* | (2006.01) |
| *H02P 6/28* | (2016.01) |
| *H02P 23/14* | (2006.01) |

(52) U.S. Cl.
CPC ............... *H02K 3/28* (2013.01); *H02K 3/522* (2013.01); *H02K 7/09* (2013.01); *H02P 6/16* (2013.01); *H02P 6/28* (2016.02); *H02P 23/14* (2013.01); *H02P 2203/03* (2013.01)

(56) References Cited

U.S. PATENT DOCUMENTS

| | | | |
|---|---|---|---|
| 9,172,324 B2 | 10/2015 | Kinashi | |
| 9,694,845 B2* | 7/2017 | Kikuchi | ................. H02K 1/146 |
| 2012/0187893 A1* | 7/2012 | Baba | ..................... H02P 25/024 |
| | | | 318/722 |
| 2013/0022481 A1 | 1/2013 | Schob et al. | |
| 2014/0009101 A1 | 1/2014 | Dietl | |
| 2014/0191624 A1* | 7/2014 | Jahshan | ................. H02K 11/33 |
| | | | 310/68 B |
| 2015/0303780 A1* | 10/2015 | Kim | ........................ H02K 1/14 |
| | | | 310/156.01 |
| 2016/0036275 A1* | 2/2016 | Sedlak | ..................... H02K 1/30 |
| | | | 29/598 |
| 2017/0019050 A1 | 1/2017 | Miyama et al. | |
| 2018/0183298 A1 | 6/2018 | Severson | |

FOREIGN PATENT DOCUMENTS

| | | |
|---|---|---|
| DE | 11 2015 002 556 T5 | 2/2017 |
| EP | 1 437 287 A2 | 7/2004 |
| EP | 2 549 113 A2 | 1/2013 |
| EP | 2 975 731 A2 | 1/2016 |
| FR | 2 966 301 A1 | 4/2012 |
| WO | 2014/207858 A1 | 12/2014 |
| WO | 2018/193095 A1 | 10/2018 |
| WO | 2018/193096 A1 | 10/2018 |

OTHER PUBLICATIONS

Aigner, F.; "Technische Universität Wien: Effizienter, leiser, sensorlos: TU Wien verbessert Elektromotoren;" https://www.tuwien.ac.at/aktuelles/news_detail/article/9062/[abgerufen; Oct. 2014; pp. 1-3.

Aigner, F.; "Technische Universität Wien: So läuft die Maschine rund, ganz ohne Sensoren—Schwebende Rotoren, beispielsweise im Elektromotor, sparen Energie. Eine Erfindung der TU Wien ermöglicht nun die sensorlose Steuerung von Magnetlagern;" https://www.tuwien.ac.at/aktuelles/news_detail/article/9363/; Mar. 2015; pp. 1-2.

Barletta, N.; "Techn. Wiss. ETH Zürich (Hrsg.): Der lagerlose Scheibenmotor;" 1998 (ETH Nr. 12870). Dissertation. S. 1-159; http://e-collection.library.ethz.ch/eserv/eth:22760/eth-22760-02.pdf; bibliographic information retrieved via: http://e-collection.library.ethz.ch/view/eth:22760; 1998; pp. 1-160.

Jia; H., et al.; "Design and analysis of a bearingless doubly salient permanent magnet machine;" 2017 20th International Conference on Electrical Machines and Systems (ICEMS), IEEE; 2017; pp. 1-5.

Iiyama, Y., et al.; "A novel middle-point current-injection type bearingless motor for vibration suppression;" Energy Conversion Congress and Exposition (ECCE), 2010 IEEE; pp. 1693-1698.

* cited by examiner

| interval | drive coils | follower coils |
|---|---|---|
| k | ①, ③, ⑤, ⑦ | ②, ④, ⑥, ⑧ |
| k+1 | ②, ④, ⑥, ⑧ | ①, ③, ⑤, ⑦ |
| k+2 | ①, ③, ⑤, ⑦ | ②, ④, ⑥, ⑧ |
| ⋮ | ⋮ | ⋮ |

Fig. 2A

| interval | k-1 | k | k+1 | k+2 | k+3 | |
|---|---|---|---|---|---|---|
| positive voltage | 3+<br>7+ | 4+<br>8+ | 5+<br>1+ | 6+<br>2+ | 3+<br>7+ | ... |
| negative voltage/ ground | 1-<br>5- | 2-<br>6- | 7-<br>3- | 8-<br>4- | 1-<br>5- | |
| follow | 2, 4, 6, 8 | 1, 3, 5, 7 | 2, 4, 6, 8 | 1, 3, 5, 7 | 2, 4, 6, 8 | | driving and selecting the drive coils

Fig. 2B

- gap is at a maximum after ③ (between ③ and ④)

- drive coils ①, ③, ⑤, ⑦

- current increases in ①, ③

- current drops in ⑤, ⑦       [minimum gap after ⑦ (between ⑦ and ⑧)]

- follower coil ④, ⑧ grounded

- follower coil ⑧, ④ on $U_M$

→ polarization depends on the winding sense
    of the coils and the orientation / magnetization
    of the permanent magnets → e.g. if coil ④ was connected positively (to $U_M$)
    in the last drive interval,
    coil ④ is also connected positively (to $U_M$)
    for the position closed-loop control → attraction and reduction of the gap at ③.

Fig. 12

ELECTRIC MOTOR WITH DIFFERENT STAR POINTS

CROSS-REFERENCE TO RELATED APPLICATION

This application is a continuation of copending International Application No. PCT/EP2018/086397, filed Dec. 20, 2018, which is incorporated herein by reference in its entirety.

BACKGROUND OF THE INVENTION

The present invention concerns electric motors and, in particular, electric motors for high rotational speeds. The electric motors may be used universally. However, particular reference is made to the use in a heat pump.

EP 2 549 113 A2 discloses a magnetic rotor and a rotary pump with a magnetic rotor. The rotor for conveying a fluid in a pump housing is drivable and storable in a magnetic and contactless manner within a stator of the rotation pump. In addition, the rotor is encapsulated by an outer encapsulation comprising fluorinated hydrocarbon. Within the encapsulation, the rotor includes a permanent magnet encased in a metal jacket. The rotary pump includes a pump housing with an inlet for supplying a fluid and an outlet for dissipating the fluid. For example, the fluid is a chemically aggressive acid with a proportion of a gas, e.g. sulfuric acid with ozone. To convey the fluid, a magnetic rotor is stored in a magnetic and contactless manner in the pump housing. The rotor is further provided with a magnetic drive that comprises electric coils. The stator is formed with laminated iron that is in operative magnetic connection with the permanent magnet of the rotor. The drive is configured as a bearingless motor in which the stator is designed as a bearing stator and a drive stator at the same time. The rotor is configured as a disc armature, the axial height of the rotor being smaller or equal to half a diameter of the rotor.

The dissertation ETH Nr. 12870, "Der lagerlose Scheibenmotor" (the bearingless disc motor), N. Barletta, 1998, discloses disc motors using magnet bearings. Magnetic bearings operate completely free of contact, wear, maintenance and lubrication. To actively stabilize a degree of freedom, two controllable electromagnets including electronic drive are needed. The bearingless disc motor is used within a bearingless blood pump as a bearingless disc motor with an active axial bearing, as a miniature disc motor, or as a bearingless biological reactor. By combining passive reluctance magnetic bearings and a bearingless motor, it is possible to fully store a disc rotor with only two actively stabilized radial degrees of freedom. Requirements for a large air gap needed in hermetic systems are met by choosing a bearingless synchronized motor that permanent-magnetically excited. A bearingless disc motor suitable for driving an axial pump for cardiac support is designed for speeds of 30.000 revolutions per minute, resulting in a smaller structural size.

Commercial electric disc motors are also known as "pancake motors". The motor concept illustrated in the two previous references is characterized by the stator extending around the motor. Such motors are also known as inrunners.

With the inrunner concept, there is the problem that the stator has to be larger than the rotor, i.e. that the size and the configuration of the rotor is limited by the stator housing, or that the rotor dominates the configuration of the stator. This limits the area of application of such a disc motor configured as an inrunner.

In addition, disc motors are fundamentally subject to the problem that the rotor, regardless of whether it is designed as an inrunner or an outrunner, is subjected to pressure differentials or pressures in certain directions. These pressures cause a bearing to be stressed in the direction of the pressure acting on the rotor, thus increasing wear, or if the deflection of the rotor is allowed, the rotor will be deflected in that direction and, thus, clearances have to be provided for that deflection. In particular, if the pump is used to pump a medium from a pressure area with a first pressure to a pressure area with a second pressure, or to generate such a pressure difference in the first place, elaborate constructional measures have to be taken so as to achieve a wear resistance needed or to provide a clearance for any deflection that occurs.

A disadvantage of electric motors, and in particular electric motors that are operated in warm environments or that are intended to achieve high performance, is the omnipresent generation of heat. High temperatures in electric motors affect, on the one hand, the permanent magnets typically arranged at the rotor. Thus, if the stator of a motor becomes too warm, the heat is transferred via the motor gap to the rotor and the permanent magnets located there, with all the associated problems. On the other hand, heating of the stator itself is also critical. The stator is typically provided with coils. Heating of the coils may lead to a high thermal stress. This high thermal stress in the coils may lead to fatigue of the coil wire insulation in the long run. In addition, problems with respect to a delamination of the sheet metal body, i.e. the stator body consisting of a sheet metal body, may occur. Furthermore, due to increased temperatures or high continuous thermal stress, deformations and/or warping in the stator may lead to the motor no longer running as smoothly as it should or could.

Particularly in the case of high-speed motors with rotational speeds above 30.000 rpm, even if a lower pressure prevails in the motor gap compared to the ambient pressure, the friction with the gas located there is nevertheless large enough that the permanent magnets of the rotor that are directly arranged in the motor gap are subject to this high friction energy in the motor gap and thus to the heat generated there. Permanent magnets have the property that their functionality/magnetization will deteriorate if they become too hot. In certain cases, this damage is even non-reversible and can lead to complete failure of the entire electric motor. However, it is also of great importance for all parameters during operation of the electric motor that the permanent magnets are kept in an optimum temperature range, which is by no means guaranteed due to the high heat generation caused by the friction in the motor gap.

EP 2 975 731 A2 discloses a disc rotor for an electric machine with a circular or annular disc-like armature body and permanent magnets arranged on the armature body adjacent to each other in the circumferential direction. In particular, the armature body includes a first material for dissipating heat in a radial direction, and further includes in the area of the permanent magnets a second electrically non-conductive material. Furthermore, in order to reliably hold the permanent magnets at the carrier element, the carrier element is provided with a surrounding edge at which the permanent magnets can be supported toward the outside. Like the area in which the permanent magnets are inserted, this edge is made of a material with good thermal conductivity, such as aluminum.

In press release 107/2014 of Oct. 24, 2014, Vienna University of Technology reports on electric motors that do not require error-prone sensors. Normally, sensors measure the position of the magnet in such electric motors with magnetic bearings and forward the data to control electronics that control the electromagnets. However, such sensors have the same problems. The sensor technology causes costs, needs space, and is particularly prone to failure. Thin wires and fine solder joints on the sensors fail easily and are therefore responsible for many motor failures. The synchronized-machine system developed at Vienna University of Technology takes a different approach. Here, the cables present anyway are used to supply power to the electromagnet. Short electrical test impulses are sent through the cables, and the current position of the rotor may be inferred from the electrical response to them. The electrical pulses needed for this only last a few millionths of a second. Appropriately designed electronics adjust to the rotational speed of the motor and control the electromagnets.

In press release 27/2015 of Vienna University of Technology, floating rotors are illustrated, e.g. in electric motors, using a sensorless control of magnetic bearings. Contactless bearings are particularly important where friction losses have to be at a minimum, and where, such as in the case of vacuum pumps, abrasion has to be avoided at all costs. Magnetic bearings are also used in drive shafts that have to achieve a particularly high rotational speed. The position of the rotor is electronically fixed in magnetic bearings. Electromagnets used for readjusting the rotor position are also used as sensors at the same time. The rotor and the electromagnetic coil are coupled by means of the magnetic field. Through the measurement of the temporal variation of the current in the coil, the position of the rotor may be calculated.

What is possibly problematic about such approaches is that additional signals have to be used so as to measure the position of the rotor in the magnetic bearing. These ultra-short test pulses have to be generated and evaluated.

SUMMARY

According to an embodiment, an electric motor may have a rotor with a first number of permanent magnets, wherein each permanent magnet encompasses a first sector; a stator with a second number of pole feet, wherein a coil is wound around each pole foot of the second number of pole feet, and wherein a pole foot encompasses a second sector that is smaller than the first sector, wherein a first group of coils is electrically connected via a first star point, wherein a second group of coils is electrically connected via a second star point to be conductive, wherein the second star point is electrically insulated from the first star point, wherein a coil of the first group of coils is arranged between two coils of the second group of coils; and a controller for applying drive signals to the first group of coils so as to provide the rotor with a torque with respect to the stator, and for applying a control signal that differs from the drive signals to at least one coil of the second group of coils.

An electric motor according to an embodiment includes a rotor and a stator. The stator has pole feet, with coils being wound around the pole feet. A pole foot encompasses a circular sector smaller than a circular sector encompassed by a permanent magnet. The coils wound around the pole feet are divided into two groups. A first group of the coils is electrically connected to each other via a first star point. In addition, a second group of coils is electrically connected to each other via a second star point, wherein the two star points are electrically insulated from each other.

Furthermore, a coil of the first group is arranged between two coils of the second group. A controller is provided so as to apply drive signals to the coils of the first group of coils in order to provide the rotor with a torque with respect to the stator. In addition, the controller is configured to apply a control signal that differs from the drive signals to at least one coil of the second group of coils.

The driving of the coils of the second group of coils may be done completely independently of the driving of the coils of the first group since the two groups of coils are separated from each other due to the fact that they have different star points. Applying a potential to a coil of the first group, e.g. the group that is used for driving the motor in a certain time interval, essentially has no effect on a coil of the second group of coils. The reason for that is that the two star points of the groups of coils are separated from each other, i.e. electrically insulated or, depending on the implementation, even fully galvanically separated from each other. Furthermore, since the arrangement and the dimensions of the pole feet wound around the coils are configured with respect to the permanent magnets such that a pole foot encompasses a circular sector that is smaller than a circular sector of the permanent magnets, there will be the case that only one groups of the two groups of coils, i.e. one star point group, is needed to drive the motor.

On the other hand, the second star point group is available for any other action of the motor. Typically, a group of coils that were the drive coils in a first time interval become in the second time interval the group of so-called "follower coils", which do not or only slightly contribute to the generation of a torque in the electric motor. Therefore, there is great freedom regarding the driving of these "follower coils" in the time interval in which these coils do not contribute to driving the electric motor.

One possibility of driving the follower coils, i.e. the second group of coils are the drive coils in this time interval, is a rotational speed control. Namely, the voltage signal needed for the torque may be applied to the second group of coils during the first time interval at a certain switch-on time, wherein this switch-on time is freely adjustable and wherein a change of the switch-on time directly affects the current that flows in the coil, if the coil contributes to driving. After the two groups of coils are galvanically separated from each other, for example, due to the fact that they have different star points, the driving of the coils with voltages is freely adjustable in the interval when the coils do not contribute to the drive, but immediately contributes to the drive when the coils contribute to the drive, i.e., when they are near a gap between two permanent magnets. By previously setting the current through a coil in advance simply on the basis of the switch-on time of the voltage applied at this coil in the time interval in which the coil is only the follower coil, the coil is, in a sense, already rendered ready so as to then be optimally energized in the interval in which it contributes to the drive of the motor.

An alternative way of driving the follower coil is to provide a closed-loop position control for a magnetic bearing. If the motor is operated as a contactless-supported motor with a magnetic bearing, the follower coils may easily be used for the closed-loop position control of the magnetic bearing. By sensing the currents in the coils currently driving the motor, the position of the rotor relative to the stator may be inferred so as to achieve a control signal for the follower coils in the same time interval or in the next time interval. Since the follower coils do not contribute to the drive, i.e. due to the fact that they have a different star point than the drive coils, they may be controlled with voltages/currents through which a closed-loop position control is achieved in that, e.g., two opposite coils of the stator are each provided with a positive and a negative reference potential, or a positive potential and ground. Thus, a force is exerted onto the rotor, since, due to this bipolar driving, an attraction is generated on one side between the follower coil and the permanent magnet opposite to it, while, on the other side, a repulsion or a comparatively small attraction is generated on the opposite side between the follower coil and the permanent magnet opposite to this coil. This force vector generated leads to a change in the position of the rotor and to a corresponding compensation of a positional deviation of the rotor in order to stabilize the contactless-supported electric motor, i.e. to electronically fix the same.

Other possibilities, or applications, of the electrical driving of the follower coils in the interval in which the follower coils do not contribute to the drive of the motor may also be used and may possibly be combined with the application possibilities of the rotational speed control and the closed-loop position control. The rotational speed control and the closed-loop position control may also be combined with each other during operation. For example, if it is determined that the closed-loop position control is currently not required since the rotor is running in a stable manner with respect to the stator, it may be possible to switch from the closed-loop position control mode to the rotational speed control mode so as to perform a requested speed increase or speed reduction, for example. For various reasons, a deliberate positional change from an optimal position may also have to be performed, e.g., to break the motor or to perform other measures. All these measures may easily be performed at the follower coils, since an energization, or a supply of the corresponding follower coils with voltages, does not have any effect on the supply of the drive coils of the corresponding other group of coils with drive signals.

BRIEF DESCRIPTION OF THE DRAWINGS

Embodiments of the present invention will be detailed subsequently referring to the appended drawings, in which:

FIG. 2A shows, in a table, an illustration of the use of different coil groups in different time intervals as drive coils or follower coils;

FIG. 2B shows, in a table, an illustration of the driving and the selection of the drive coils of FIG. 1;

FIG. 12 illustrates a summary of states or actions when performing a closed-loop position control;

DETAILED DESCRIPTION OF THE INVENTION

Figure 1:
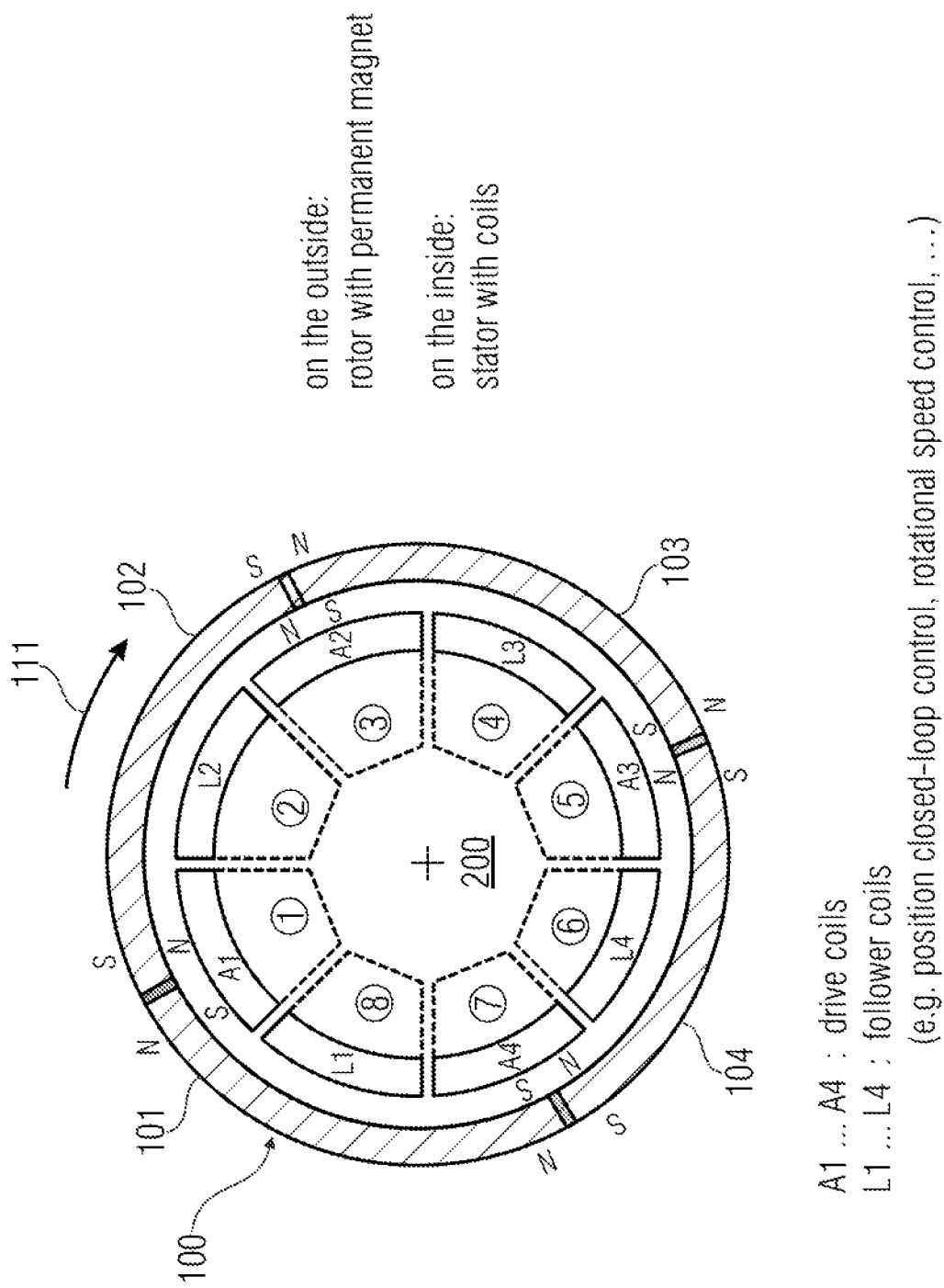
FIG. 1 shows a schematic top view of a motor with an external rotor with permanent magnets and an internal stator with coils.

FIG. 1 shows a top view of an electric motor. The electric motor comprises a rotor 100 arranged on the outer side in FIG. 1. Thus, the example shown in FIG. 1 is an outrunner. However, the present invention is equally applicable to an inrunner in which the stator is arranged around the rotor and thus the rotor is arranged internally relative to the stator. In the following, however, the present invention is illustrated only by way of example with reference to the outrunner. However, the invention is readily transferrable and applicable to inrunners.

The rotor 100 includes a first number of permanent magnets 101, 102, 103, 104, with each permanent magnet including a first circular sector. The circular sector in the embodiment with four permanent magnets shown in FIG. 1 is in each case 90°, or an angle that is slightly smaller, since, as is exemplarily illustrated in FIG. 1, after the permanent magnets are separated from each other and are differently polarized, so that, e.g., the permanent magnet 102 has a north pole toward the motor gap, whereas the permanent magnet 101 or 103 has its south pole toward the motor gap. Although FIG. 1 shows a rotor with four permanent magnets, rotors with three or more than four permanent magnets may easily be used. It is advantageous that each permanent magnet includes the essentially same circular sector so that, when using three permanent magnets, e.g., each permanent magnet would encompass 120°, or slightly less than 120°, e.g., whereas in the use of eight permanent magnets, each permanent magnet would encompass approximately 45°.

The electric motor further includes a stator 200 with a second number of pole feet, shown in dashed lines in FIG. 1 and denoted by circled numerals (1, 2, 3, 4, 5), 6, 7, 8, these circled numerals also denoting corresponding coils wound around the pole foot. There is a second number of pole feet. In the example shown in FIG. 1, the second number of pole feet is greater than the first number of permanent magnets on the rotor. In particular, eight pole feet are used and therefore eight coils, while four permanent magnets are used. However, other ratios may also be used, provided that the number of the pole feet is larger than the number of the permanent magnets. Accordingly, each pole foot, or each coil wound around the corresponding pole foot, encompasses a second circular sector smaller than the first circular sector encompassed by the permanent magnets.

Figure 3:
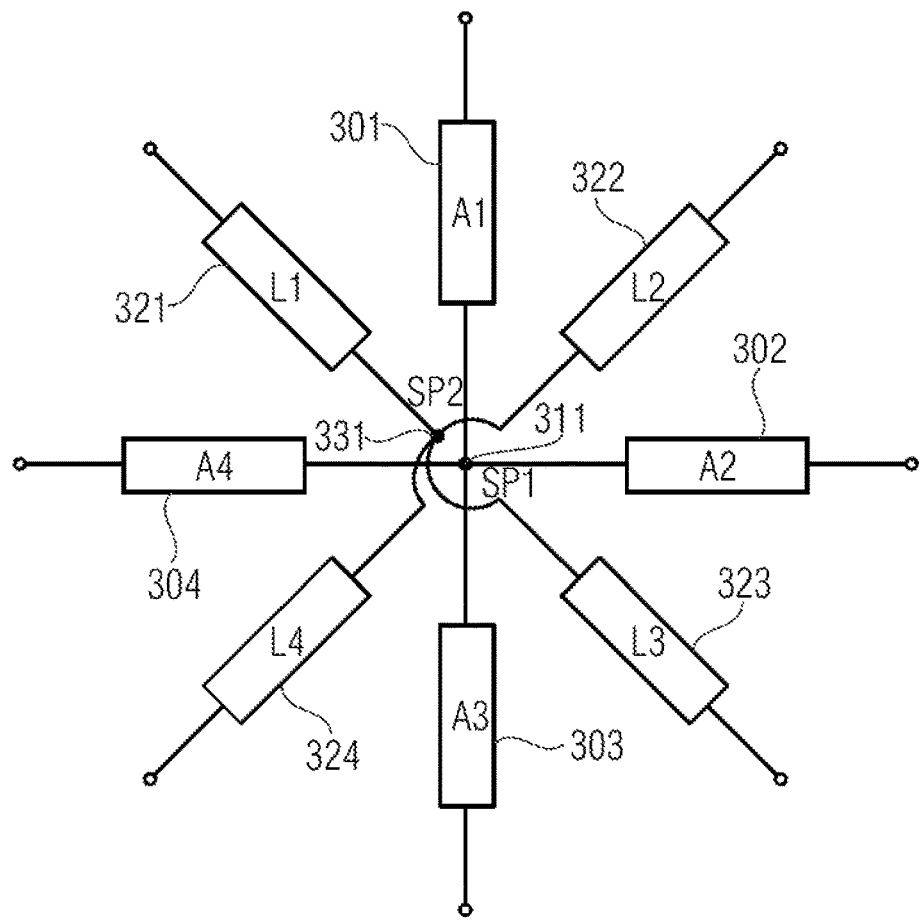
FIG. 3 shows a schematic illustration of the relatively arranged coil groups with the different star points 1 and 2.

In particular, a first group of coils A1, A2, A3, A4 is electrically connected to each other via a first star point, as is shown in FIG. 3. The first group of coils is denoted by 301, 302, 303, 304. The first star point SP is shown at 311. In addition, a second group of coils L1, L2, L3, L4, in FIG. 3 also denoted by 321, 322, 323, 324, is connected to a second star point SP2, denoted by 331. The second star point 331 is electrically insulated from the first star point 311. Further, as is shown in FIG. 3 and as can also be inferred from FIG. 1, a coil of the first group of coils is arranged between two coils of the second group of coils.

Figure 5:
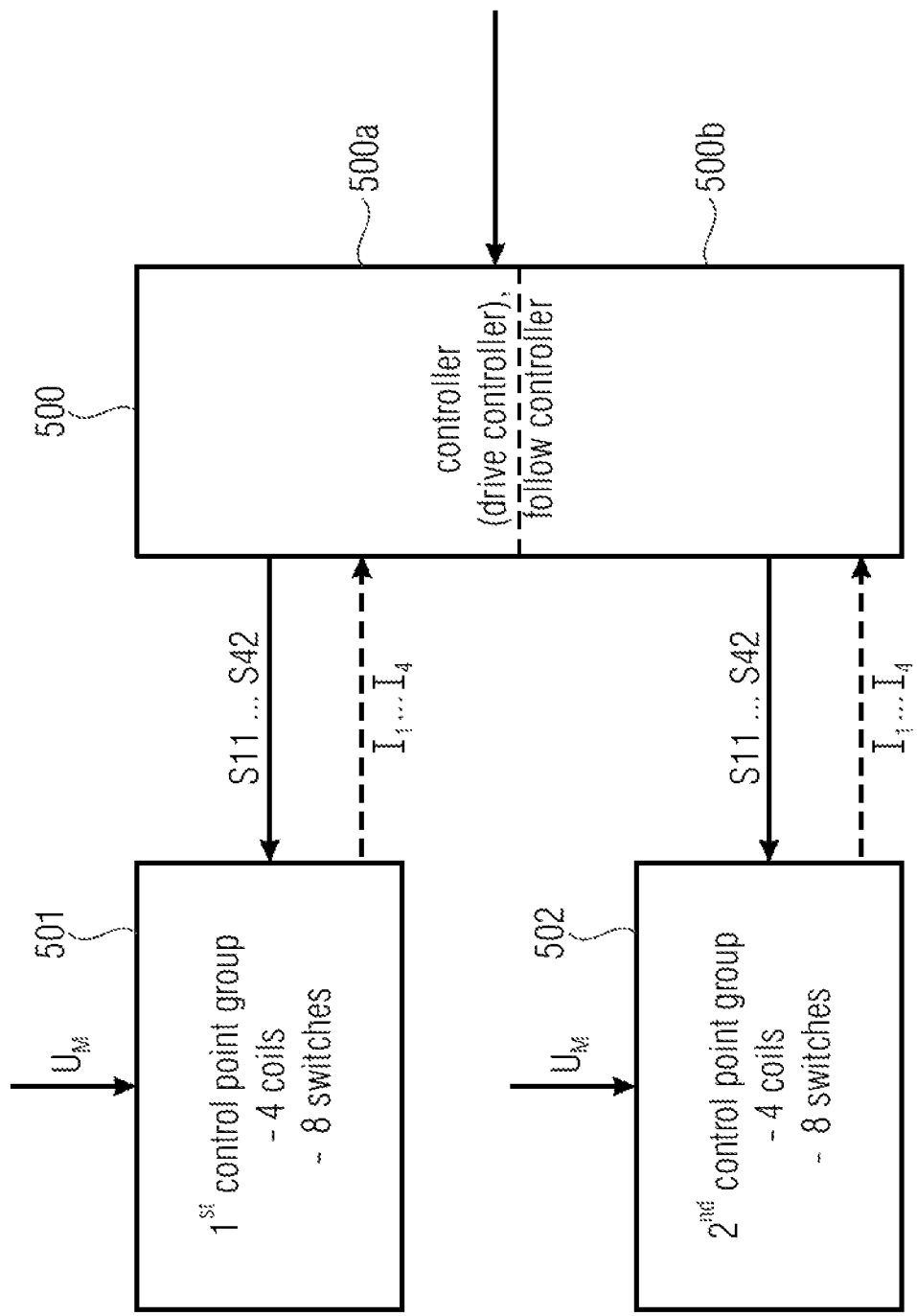
FIG. 5 shows a schematic illustration of the two star point groups in a corresponding controller.

In addition, a controller 500, shown in FIG. 5, is provided so as to apply drive signals to the coils of the first group of coils, i.e. the drive coils, so as to provide the rotor with a torque relative to the stator. The controller 500 further includes a functionality for performing the follower control, i.e. to apply a control signal that differs from a drive signal to at least one coil of the second group of coils, which do not contribute to the drive of the motor. For example, the control signal that may be applied to one coil of the second group of coils is a control signal for opening a switch so as to disconnect a reference potential that has been applied in the preceding time interval, for example. Alternatively, the control signal may control signal applied to a switch so as to ground a connection of a coil that is not connected to the star point. Alternatively, the control signal may also be a control signal at a switch so as to apply a reference potential that has previously not been applied to a coil. However, the control signal may also include a voltage at one or several coils or a current through a coil or currents through several coils for the drive coils and the follower coils.

Advantageously, for the rotational speed control, a reference potential is applied at a certain point in time, based on of which, in case of a known current rise, a certain current flows through the coil at the start of the next interval in which the follower coil again becomes a drive coil. If the switch-on time is selected to be earlier, the time of the rise until the coil again becomes the drive coil is larger, and the current will be higher so as to increase the rotational speed. However, if the switch-on time is selected to be later in the time interval in which the coil is not the drive coil, the current will be smaller, and there will be a gradual decrease of the rotational speed.

In alternative embodiments, applying at least one coil of the second group of coils with a control signal is a control for the closed-loop position control. Here, at a certain coil of the, e.g., four coils of the second group of coils, a signal may control a switch such that a reference potential is applied to the coil, while a ground potential or a negative reference potential is applied at a coil arranged opposite thereto, for example. This exerts a force on the rotor to vary the position of the rotor such that an offset of the rotor relative to the stator, or an unevenly large motor gap, is evened out, or the offset is compensated or eliminated.

FIG. 2A shows, in a table, an illustration as to which coils are the drive coils and which coils are the follower coils at a certain interval. In the state of the rotor 100 relative to the stator 200 shown in FIG. 1, the first group of coils A1, A3, A2, A4, also denoted by 1, 3, 5, 7, is the group of drive coils, since the coils are each opposite to a boundary between two oppositely polarized permanent magnets. On the other hand, the second group of coils L2, L3, L4, L1, also denoted by 2, 4, 6, 8, does not sense any magnetic field change. Thus, this group of coils does not contribute to the drive. This is true for the interval k. For the interval k+1, the rotor has reached a certain rotation so that the boundary between two oppositely polarized permanent magnets is no longer opposite the coil A2, but opposite the coil L3. Thus, the coil L3 becomes the drive coil, and the coil A2 and the coil A3 become follower coils in this time interval. This is illustrated in the second line of the table of FIG. 2A. If the rotor has then continued to rotate so that the rotor is arranged in such a way that the transition between two oppositely polarized permanent magnets is again opposite the drive coil A3, e.g., the first group of coils is again the group of drive coils and the second group of coils are the follower coils. This is shown at the interval k+2. Thus, in the embodiment shown in FIG. 2A, an interval has a temporal length that is one fourth of the temporal length needed for an entire revolution of the rotor around the stator.

FIG. 2B shows, in a table, a summary of the driving and the selection of the drive coils. For example, in the interval k−1, the coils 3, 7 are positively connected, and the coils 1, are on a negative voltage, or on ground. Then, in interval k, the coils 4, 8 are positive, and the coils 2, 6 are on a negative voltage or on ground. Then, in the subsequent interval k+1, the coils 5, 1 are positive, and the coils 7, 3 are negative, or on ground. In the subsequent interval k+2, the coil 6, 2 are positive, and the coils 4, 8 are negative, and in the interval k+3, the coils 3, 7 are positive, and the coils 1, 5 are negative or on ground. The last line of the table in FIG. 2B shows the follower coils whose drive signals may be selected as desired, since they do not affect the respectively other coil group due to the different star points for the coil groups. In the interval k+4, there is the same situation as in the interval k, and so on. This achieves that the rotor rotates with respect to the stator, as is known for such rotational field machines.

Figure 4:
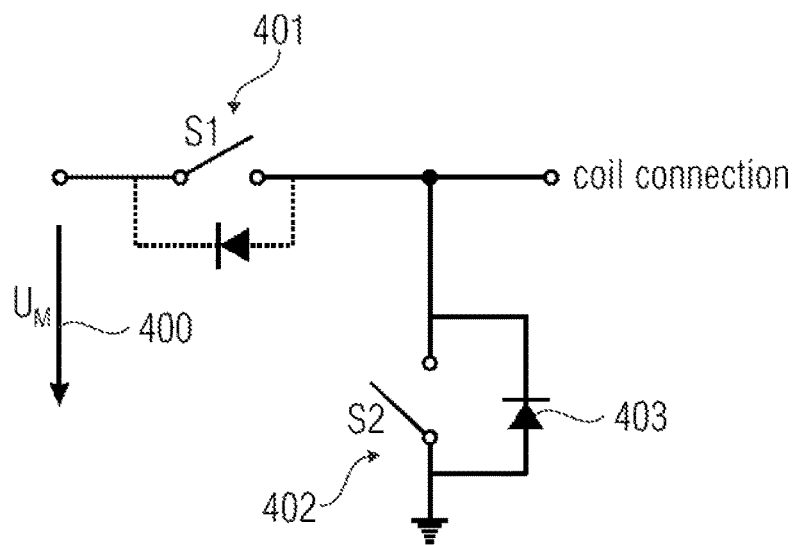
FIG. 4 shows an electric circuit for a coil connection.

FIG. 3 shows the arrangement of the coils of the different groups such that one coil of the one group is arranged between two coils of the other group. FIG. 4 shows an embodiment for a switch element that may be used to control a coil. A control potential 400, denoted by Un, may be applied between a positive connection and a ground connection. In addition, there is a first switch L1, denoted by 401, and a second switch L2, denoted by 402. In addition, in an embodiment, the switch S2 may be bypassed, for example with a freewheeling diode 403. A corresponding freewheeling diode, shown in dashed lines in FIG. 4, may also bypass the switch S1 such that the reverse direction of the diode is as shown in dashed lines in FIG. 4.

The switch element draw in in FIG. 4 is advantageously arranged at each coil connection in FIG. 3, with each coil connection of the first group advantageously having its own reference potential and therefore also its own ground potential, such that, overall, each star point group has its own reference potential and its own ground potential. As is shown in FIG. 5, this schematically results in a first star point group 501 with four coils and eight switches, and a second star point group 502 with four coils and four switches, all controlled by the controller 500. In particular, the controller 500 is configured to provide all control signals for the corresponding switches S1, S2 for each coil connection.

Furthermore, particularly if the follower coils are each used for the closed-loop position control, each star point group is provided with corresponding current sensors so as to sense the currents in the coils of the drive group, and to determine and to transfer, depending on the sensed currents, the closed-loop position control signals, which are in turn control signals to corresponding switches, in the same time interval or in the next time interval.

Figure 6:
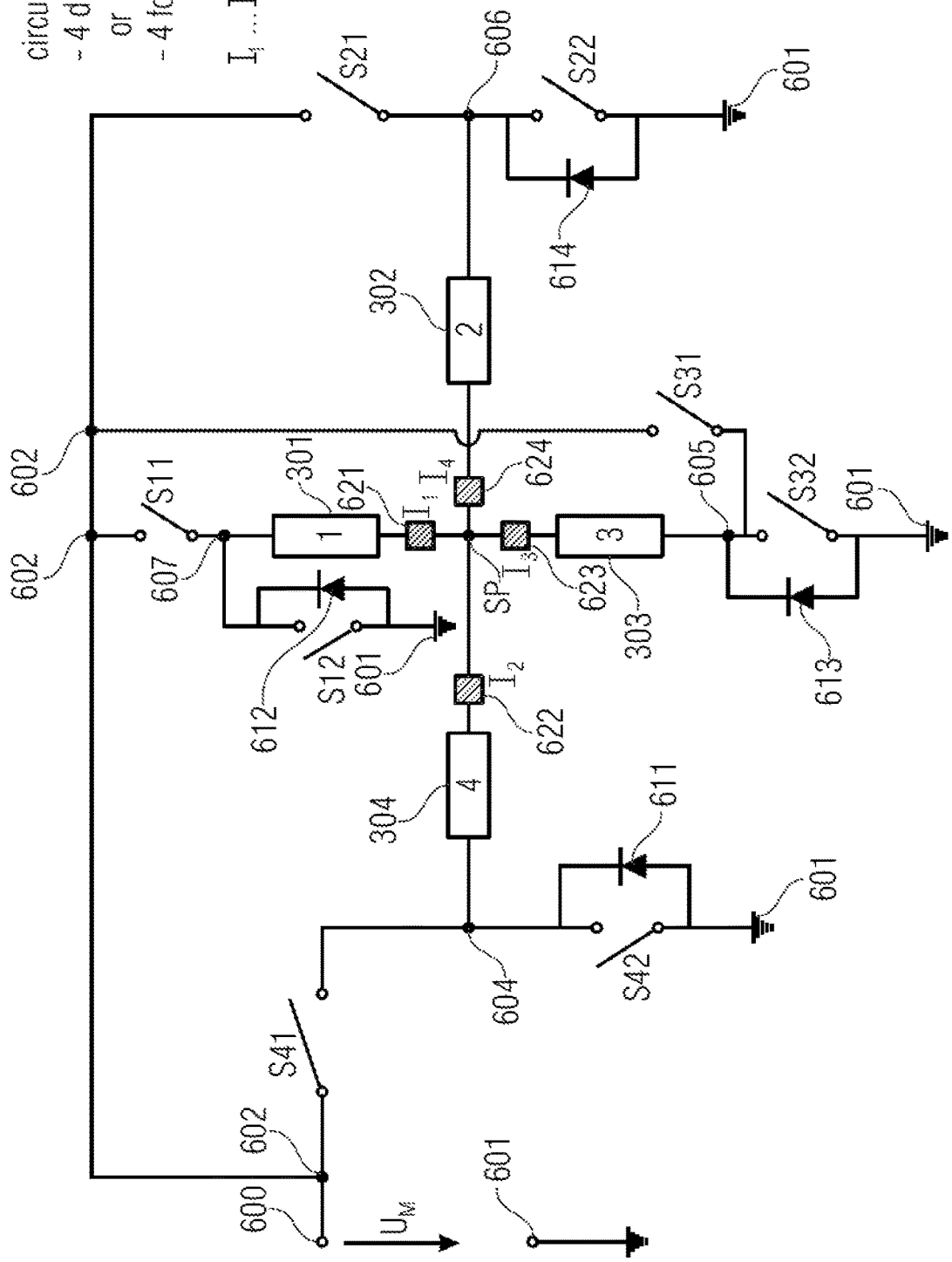
FIG. 6 shows an illustration of the complete driving for the four drive coils or the four follower coils in the embodiment shown in FIG. 1.

FIG. 6 shows a complete circuit with coils 301, 302, 303, 304, and switch groups S11, S12 for the first coil 301, S21, S22 for the second coil 302, S31, S32 for the third coil 303, and S41, S42 for the fourth coil 304. In particular, it is advantageous to use only a single reference potential $U_M$. This reference potential is present between a connection 600 and a ground connection 601. The switch S41 for the fourth coil 304, the switch S11 for the first coil 301, the switch S21 for the second coil 302, and the switch S31 for the third coil 303 are connected at a first node 602. For clarity, this node 602 is drawn multiple times in FIG. 6. Furthermore, the respective second switch is attached in an intermediate node, denoted by 604, e.g., as is shown at 604 for S42. The second switch S32 is attached at the intermediate node 605, i.e. between this intermediate node 605 and the ground potential 601. In addition, the switch S22 is attached at a further intermediate node 606, i.e. between this intermediate node and the mass. In addition, the switch S12 is also connected between an intermediate node 607 and the ground potential 601. Thus, each coil has a switch to the reference potential and a further switch to the ground potential at the connection that is not connected to the star point SP, wherein the respective intermediate node, e.g. the intermediate node 604, 605, 606, 607, is exactly this coil connection that is in each case not connected to the star point. In addition, at least every second switch, e.g. S12, S22, S32, S42, advantageously includes a freewheeling diode 611, 612, 613, and 614, respectively. In addition, a current sensor, denoted by 621 for the first coil, 622 for the second coil, 623 for the third coil, and 624 for the fourth coil, is provided for each coil.

Each current sensor measures a current through the corresponding coil, i.e. I1, I2, I3, I4. For example, a resistor with a known magnitude may be used as a current sensor, wherein the voltage dropped across that resistor is measured to sense the current. Alternatively, a Hall current element or the like may be provided.

The circuit shown in FIG. 6 is implemented advantageously in exactly the same way for the first star point group 501 and for the second star point group 502, however, advantageously using different voltage sources to supply the reference voltage $U_M$ between the connections 600 and 601, and advantageously even using galvanically separated ground potentials, and, however, wherein at least the two star points of the two circuits are electrically insulated from each other. For example, insulation resistances of 1kΩ may already be sufficient in certain embodiments. However, much higher insulation resistances in the range of more than 10 MΩ or even 100 MΩ are advantageous in order to achieve true galvanic separation between the two star point groups in such a way that as little interference as possible takes place between the drive control by a first star point group and the follower control by the second star point group.

Figure 8:
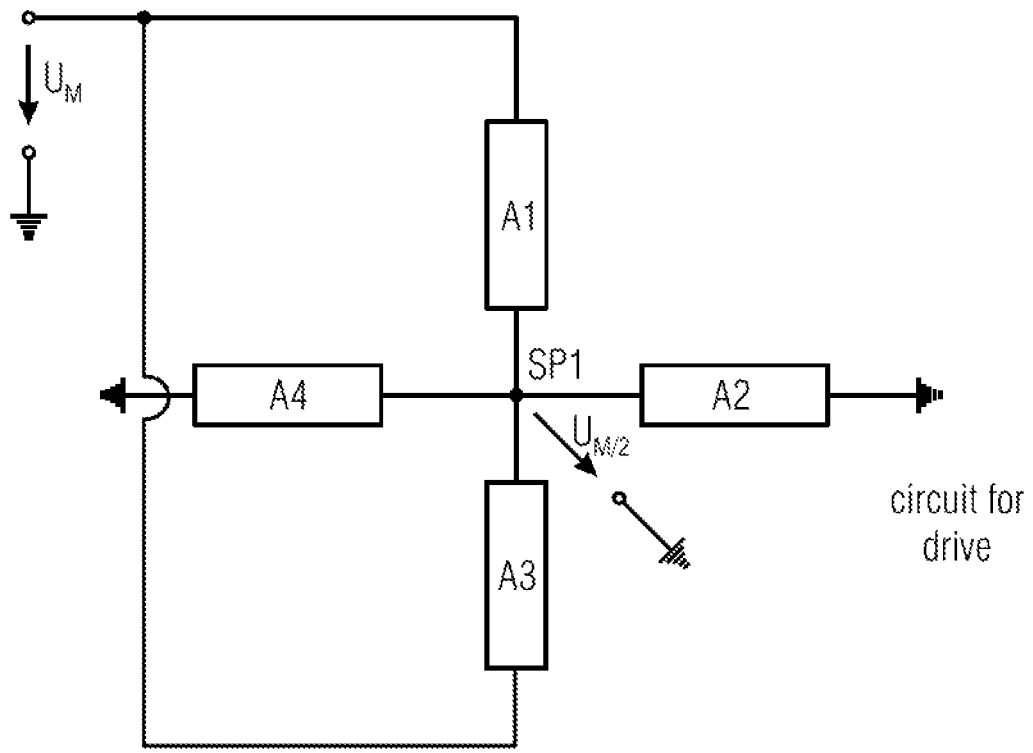
FIG. 8 shows driving of the drive coils with a single driving potential MM.

FIG. 8 shows an advantageous circuit of the first star point group for the drive. In particular, the coils A1, A2, A3, A4 are connected as is shown in FIG. 8. Thus, a voltage that is equal to the reference voltage $U_{M/2}$ is present at the coils A1, A3. In addition, a voltage that is equal to the negative half reference voltage $U_{M/2}$ is present at the two other coils A4, A2. In addition, the star point SP1 is on a potential $U_{M/2}$ with respect to the ground.

With regard to the switch control, the circuit the drive exemplarily shown in FIG. 8 means the following for a certain interval, namely for the interval k+1 of FIG. 2B. The switch S41 is open and the switch S42 is closed. On the other hand, the switch S11 of FIG. 6 is closed, while the switch S12 is open. In addition, the switch S31 of FIG. 6 is closed, while the switch S32 is open. In addition, the switch S22 is closed, while the switch S21 is open. This results in the voltage situation of the interval k+1 of FIG. 2B to achieve a drive control.

Figure 9:
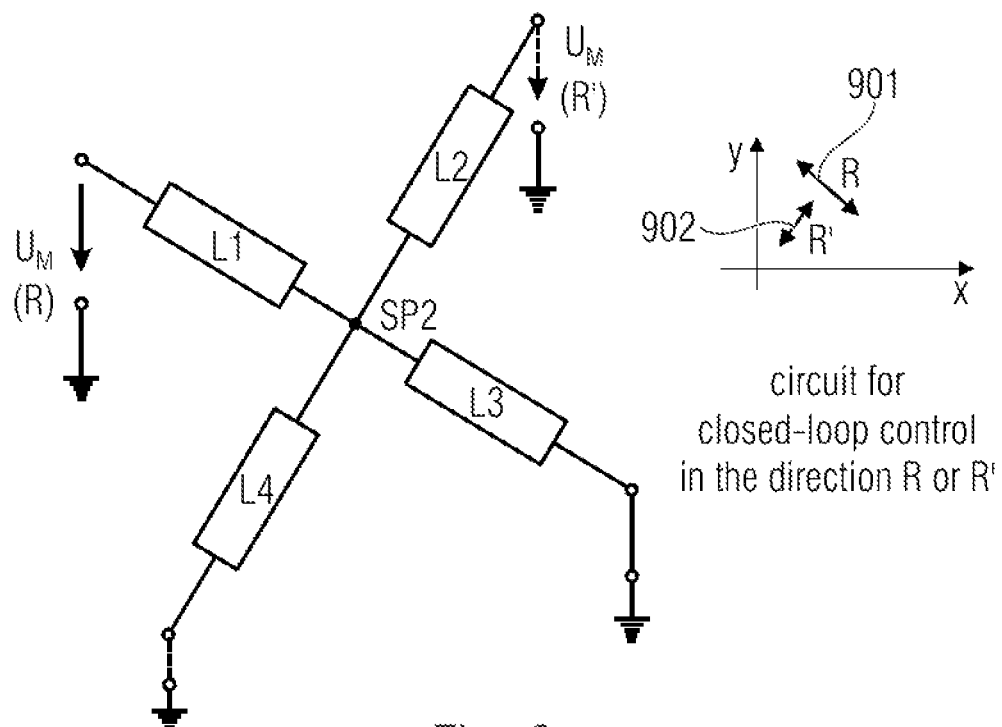
FIG. 9 shows driving of the follower coils so as to achieve a closed-loop position control in a corresponding direction.

On the other hand, FIG. 9 shows an exemplary circuit for a closed-loop control in the direction R in the schematic coordinate system drawn in the upper part of FIG. 9. The closed-loop control along the direction R represents a closed-loop control in the negative x direction and/or positive x direction, and the negative y direction and/or positive y direction, as is illustrated by the arrow 901. To this end, one of the coils L1, L3 is connected to the ground, while the respectively other coil is connected to the reference potential $U_M$. The two other coils L2, L4 are open when closed-loop control is to take place along the direction 901. Again considering the circuit in FIG. 6, this means that, to put the coil L1 onto the reference potential, the switch S11 and the switch S12 are open. In addition, the switch S31 for the coil L3 is open, and the switch S32 is closed. Thus, the full potential $U_M$ is present at the coils L1, L3, and, when the coils L2, L4 are not driven at the same time, a force is exerted in the direction of the arrow R 901. In order to switch the coils L2, L4 accordingly, advantageously all switches S41, S42 and S21, S22 are fully open, so that the intermediate nodes 604, 602 are floating.

Alternatively, to achieve closed-loop control in the direction of the arrow R' 902, the two coils L2, L4 have to be between the reference potential $U_M$ and ground, while the two coils L1, L3 are floating. To this end, the switches S21, S42 would have to be closed and the switches S22, S41 would have to be opened. The same also applies for the switches S12, S11, S32, S31, which also would have to be opened to bring the coils L1, L3 into the floating state.

On the other hand, if it is advantageous to achieve control along another direction than the direction 901, 902, it is advantageous to apply the voltage to L1 and L2 and to put L3 and L4 to ground. Then, a force along the x-axis and/or y-axis of the diagram in FIG. 9 would be exerted onto the rotor. Since each direction may be set by accordingly combining two orthogonal directions in the sense of a parallelogram of forces, closed-loop control in each direction is therefore possible qualitatively but also quantitatively, depending on the implementation.

For example, to connect the coils L1, L2 to the reference potential, the switches S11, S21 would have to be closed, and the switches S12, S22 would have to be opened. On the other hand, the switches S41, S31 would have to be opened, and the switches S42, S32 would have to be closed.

Figure 7:
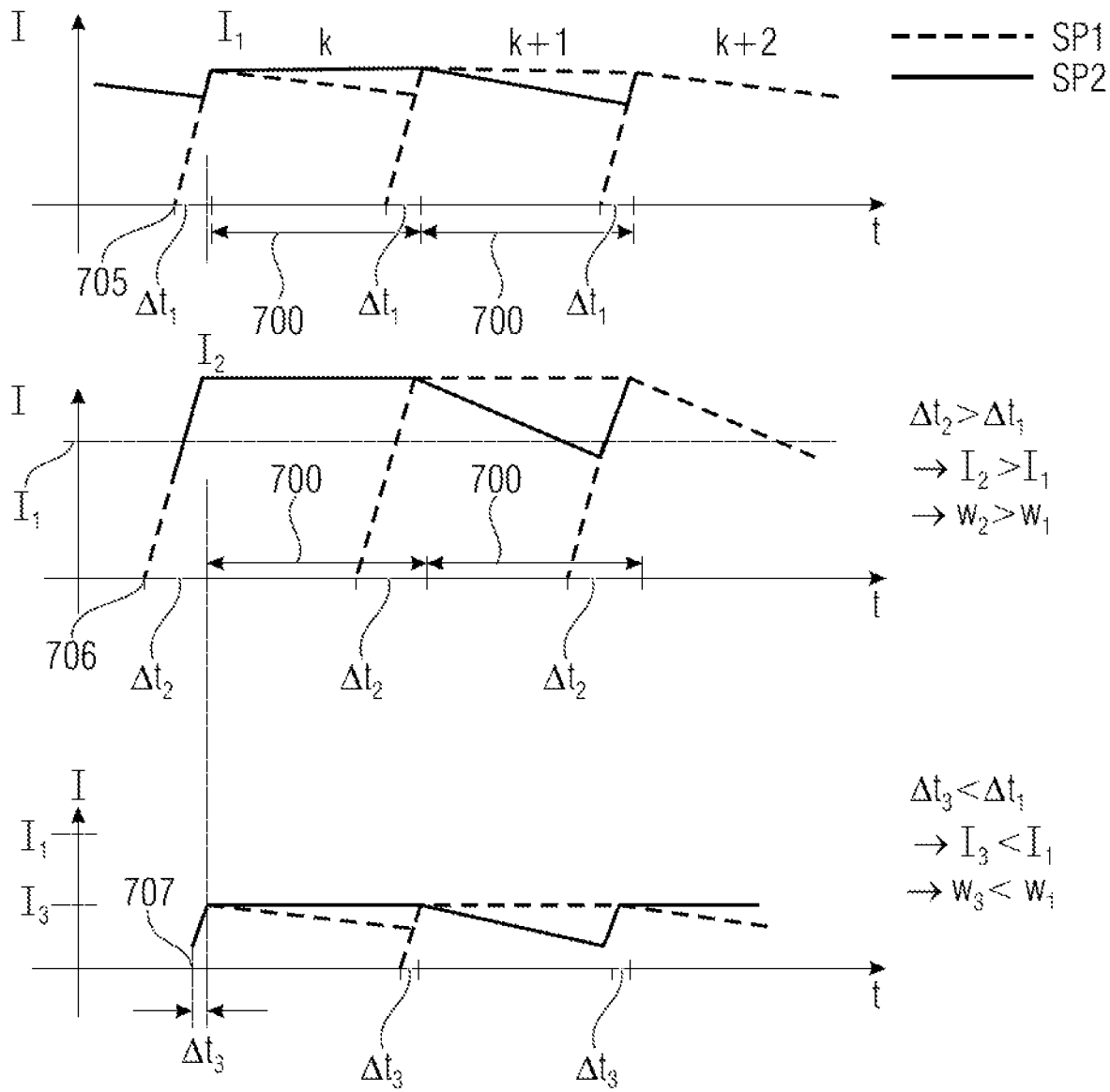
FIG. 7 shows time diagrams for the currents measured for the individual coils so as to illustrate a rotational speed control via the switch-on time in the "neutral" interval.

In the following, FIG. 7 illustrates a first aspect for controlling the rotational speed of the motor via the switch-on time. The intervals are each shown in FIG. 7 at 700. In addition, the respective ordinate axes in the time diagrams in FIG. 7 each show the current through a coil. In particular, the current progression of a coil that is in the drive mode in the first interval k is shown, i.e. that belongs to the first star point group, however, that belongs to the second star point group in the second interval k+1 and is therefore a follower coil. In addition, FIG. 7 shows in the upper diagram a situation in which the dashed line respectively represents the current progression of another coil that is in the other group. This shows that the solid current progression in interval k is the current progression of a drive coil, and the dashed current progression is a decreasing current progression of a follower coil. Since the follower coil has no influence on the drive, it is not problematic that the current slightly decreases in the interval k. In the same way, the current could also drop completely, as is subsequently illustrated with reference to FIG. 10. However, if the current drops slightly, this is achieved, e.g., by setting certain switch positions of the switches, as has been illustrated based on FIG. 6. In any case, each coil is provided with a corresponding inductance L. Moreover, the relationship between voltage and current across a coil is such that the voltage across the coil is equal to the product of the inductance of the coil and the dissipation of the current through the coil over time. Thus, if a coil currently operates as a follower coil, when a voltage is applied at a given time 705, the current will constantly increase, as is illustrated by the dotted line in FIG. 7, i.e. with a constant rate of increase, since the inductance of the coil is constant. Thus, at the time 705, shortly before the start of interval k, a voltage is applied to the coil considered in the first diagram in FIG. 7 by setting the switches accordingly, as is shown in FIG. 6, whereupon the current increases, that is up to its value $I_1$.

The point in time at the current value $I_1$ determines the start of the interval k, this means that the considered coil changes from being the follower coil to being the drive coil. Due to this fact, there is a mutual inductance, and the current $I_1$ does not further increase but remains constant as long as this coil contributes to the drive. At the end of the interval k, the coil no longer contributes to the drive signal but again becomes a follower coil, and the current through the coil in this interval does not play a particularly important role, for example, it can therefore drop slightly, as is shown by the solid line in interval k+1.

The situation in FIG. 7 is achieved if the time interval $\Delta t_1$ between the switch-on time 705 and the start of the interval k, or k+1, has a corresponding value. With this, a certain current $I_1$ with a certain magnitude is reached. However, if, as is shown in FIG. 7 in the second diagram, the switch-on time 706, which is earlier with respect to the switch-on time 705, is now selected, the switch-on time interval $\Delta t_2$ becomes larger. Due to the constant increase of the current in a coil if the coil is just a follower coil, a maximum current $I_2$ is now reached. This maximum current $I_2$ does no longer increase if the rotor has moved to such an extent that the considered coil is no longer a follower coil but a drive coil that contributes to the drive.

This current $I_2$ remains constant until a transition takes place from the interval k to the interval k+1. At this point in time, the circuit in FIG. 6 is driven with a control signal or several control signals so as to disconnect the reference potential in any manner possible so that the current no longer increases, e.g., but decreases, as is shown in FIG. 7. Simultaneously, another coil that was the follower coil in the interval k is again turned on with the larger time interval $\Delta t_2$ so as to achieve the current $I_2$ when the interval k+1 starts, etc. This results in the switch-on interval $\Delta t_2$, selected to be larger than $\Delta t_1$, leading to the fact that the current in the coil becomes larger when the coil becomes the drive coil. Since the current is proportional to the rotational speed, this achieves a larger rotational speed so that, at a larger time interval $\Delta t_2$, the rotational speed $\Omega_2$ is larger than the rotational speed $\Omega_1$ when the time interval $\Delta t_1$ is smaller.

Similarly, a reduction in rotational speed may also be achieved if the switch-on time 707 is shifted closer to the interval limit than the switch-on time 705. This reduces the current achieved in the coil to the value $I_3$, which is smaller than $I_1$, when the coil becomes the drive coil. Thus, a rotational speed that is smaller than the speed $\Omega_1$ achieved in the situation in the upper diagram of FIG. 7 is achieved.

What becomes apparent is that a rotational speed control may be achieved solely by the selection of the switch-on time under consideration of the linear increase of the current due to the constant inductance of the coil and due to the constant applied voltage, wherein all switching measures are performed at the follower coils. This avoids that a corresponding unrest is brought into the operation of the motor, since the motor runs particularly smoothly due to the fact that the drive coils are already "prepared" for the correct state in the corresponding time intervals in which the drive coils are still follower coils themselves. Therefore, the electric motor does not see any rises and drops of the current through the coils, which would cause an uneven operation, but the electric motor only sees constant currents from one interval to the next, however, alternating from one coil of the first star point group or a coil of the second star point group.

Figure 10:
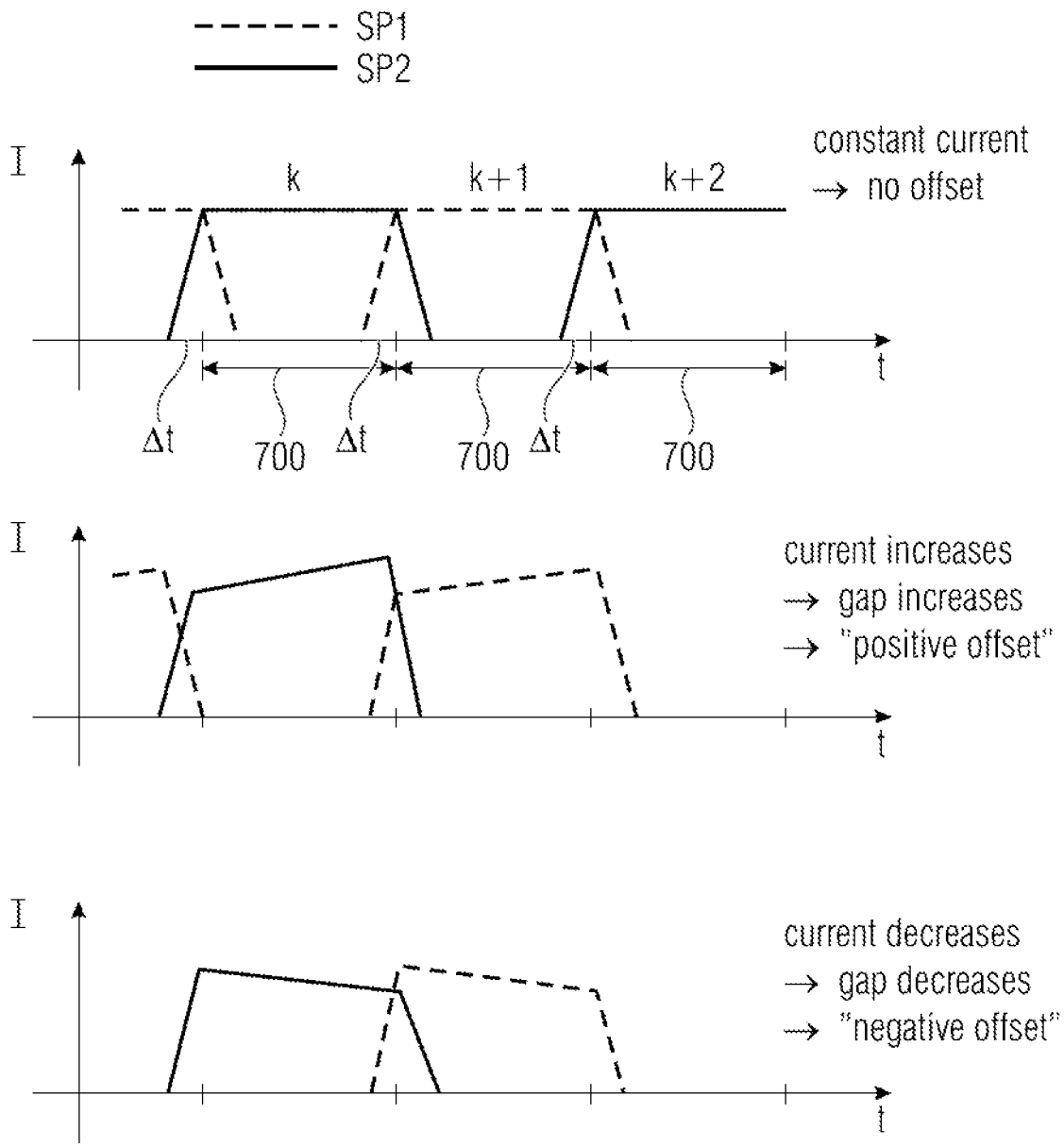
FIG. 10 shows diagrams of currents in coils for sensing a rotor offset.

Alternatively or additionally, however, the fact that there are two star point groups, and therefore drive coils and follower coils, may also be used for a closed-loop position control of a magnetic bearing. This is schematically illustrated in FIG. 10. FIG. 10 again shows intervals k, k+1, k+2, wherein the solid progression is a progression of a coil of the second star point group, and the dashed progression is the current progression of a coil of the first star point group. For the uppermost current progression shown in FIG. 10, the situation is such that the rotor is perfectly aligned relative to the stator, and the motor gap is constant over an entire revolution for the considered coil. Therefore, the current I in a coil is constant when the coil is the drive coil. A constant current indicates that there is no offset. When the drive coil becomes the follower coil, such as in the interval k+1 for the coil of the second star point group SP2, the current may also be fully brought to zero, e.g., unlike in the embodiment shown in FIG. 7. For example, this could be achieved by placing the connection of the coil to ground, i.e. the intermediate node, e.g. 604, 605, 606, 607, of FIG. 6 of the respective coil is put to ground by the corresponding switch as S42, S32, S22, S12. Then, the coil would discharge and the current would drop, as illustrated in FIG. 10. Switch-on may be performed at an appropriate switch-on time, e.g., wherein this switch-on time may be selected as is described in FIG. 7 if certain rotational speed increases or rotational speed decreases are to occur. However, if the rotational speed is to remain the same, the switch-on time would be selected in the corresponding interval $\Delta t$ before the interval limit.

However, if a progression as in the second illustration of FIG. 10 would be measured by means of a current sensor, where the current increases in the interval, this means that the motor gap the considered coil "sees" becomes larger in the course of the revolution of the rotor around the considered coil, i.e. there is a "positive offset", so to speak. This means that the rotor and the stator do not have the same exact central axis, but that the central axes of the two motor elements are offset. In particular, as has already been said, the increasing current indicates an increasing gap.

In contrast, as shown in FIG. 10, a falling current across the interval indicates a decreasing gap that the considered coil "sees" when the rotor rotates past the coil, in turn indicating a negative offset.

The evaluation of these currents is advantageously used to determine whether there is an offset at all, and which direction the offset exists in so as to generate a corresponding closed-loop position control by accordingly driving the follower coils in the same interval the measurement takes place in, or in the next interval, i.e. in the interval that follows the interval of the measurement.

Figure 13:
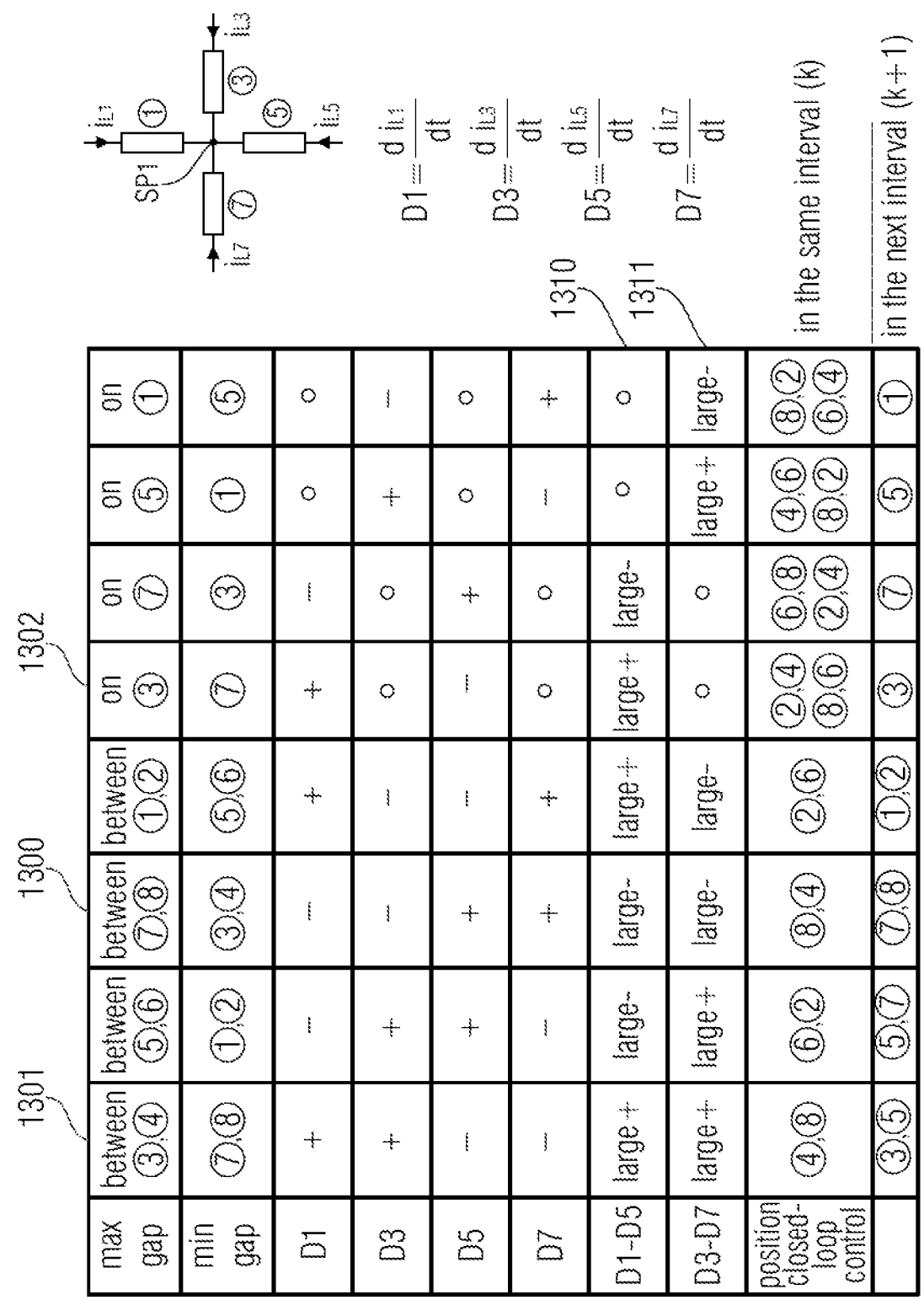
FIG. 13 shows, in a table, an illustration for sensing the position of the rotor offset and the corresponding driving for the closed-loop position control due to a temporal change of the coil currents.

To this end, reference is made to FIG. 13. FIG. 13 shows a table with different gap positions, in particular a position of a maximum gap and of a minimum gap.

Furthermore, to illustrate the nomenclature, the drive coils 1, 3, 5, 7 are illustrated in FIG. 13, approximately corresponding the drive coils of the same numerals in FIG. 1. In addition, the currents $i_{L1}$, $i_{L3}$, $i_{L5}$ and $i_{L7}$ through the coils are illustrated. In addition, the table contains the dissipations of these currents D1, D3, D5, D7 according to the time, i.e. with respect to a qualitative formation, i.e. whether the change of the current is positive, indicating an increasing gap, or whether the change is negative, indicating a decreasing gap, or whether the change is zero when considered as a whole, indicating an optimal alignment or that there is both an increase and a decrease in current in this interval, i.e. the dissipation is on average equal to zero or very small.

It should be noted that the dissipation may be calculated arbitrarily as long as a momentary or average change in current is calculated over time. Thus, for example, the dissipation could be calculated by forming a difference from two current values in the interval. Depending on the implementation, this is already sufficient, since the corresponding evaluation as to how the closed-loop position control is performed takes place in a qualitative manner in the embodiment shown in FIG. 13 anyway.

For example, if it is determined that the dissipations D1, D3 are positive, and that the dissipations D5, D7 are negative, a difference between D1 and D5 would lead to a large positive value, and a difference between D3 and D7 would lead to a large value. If these two combination quantities, i.e. the difference of D1 and D5 on the one hand and the difference of D3 and D7 on the other hand would both result in large values, this means that the maximum gap is between the coils 3 and 4, and 3 and 5, respectively, and the minimum gap is between the coils 7 and 8, and 7 and 1, respectively, of FIG. 1. On the other hand, if the maximum gap would be between 7 and 8, and 3 and 4, for example, the dissipations D1, D3 would be negative, and the dissipations D1, D7 would be positive, so that the two combination values D1-D5 on the on hand and D3-D7 on the other hand would lead to large negative values, as is illustrated in column 1300 of FIG. 13. Accordingly, e.g., an evaluation would also lead to the fact whether the maximum gap and therefore also the minimum gap is at a position as illustrated in one of the last four columns. For example, if the maximum gap would oppose the coil 7, as is exemplary illustrated at 1302, the minimum gap would oppose the coil 3. D1 would be negative, D3 would be approximately zero, D5 would be positive, and D7 would be approximately zero. D1-D5 would lead to a large negative value and D3-D7 would lead to a value of approximately zero. Accordingly, due to the different evaluations of the combination sizes D1-D5 on the one hand and D3-D7 on the other hand, which could be greatly positive, greatly negative and also zero, a different localization of the maximum and/or minimum gap could be inferred, as is illustrated in the two first lines in FIG. 13.

The last two lines in FIG. 13 again illustrate which coils may be controlled for the closed-loop position control. A distinction is made as to whether the closed-loop position control is still performed in the same interval or in the next interval, i.e. when the roles of the drive coils and the follower coils are swapped. Depending on the implementation, if the intervals are large enough, the closed-loop position control may be performed in the same interval. For the first line 1301, where the maximum gap is between the coils 3 and 4, and 3 and 5, respectively, i.e. somewhere opposite to the coil 4, e.g., a positive potential could easily be applied to the coil 4 and a negative potential, or a ground potential, could be applied to the coil 8, with a polarity that would cause the rotor to be attracted to the coil 4 so as to significantly reduce the motor gap. If, on the other hand, a closed-loop position control would not take place in the same interval but in the next interval, in the case of a rotation direction such as that shown at 111 in FIG. 1, the coil 3 or the coil 5 would be used for the closed-loop position control, and would be used to apply a positive potential, e.g., since the coils 3 and 5 in the interval k−1 would then no longer be the drive coils but the closed-loop position control coils.

Similarly, for example, as shown in column 1302, a closed-loop position control would be performed in the same interval in which the maximum gap is opposite to the coil 7 in FIG. 1, using the closed-loop position control coils 6, 8, e.g., to apply a positive potential, and the other coils 2, 4 to apply a negative potential or ground. However, if the closed-loop position control is performed in the next interval, the coil 7 itself may be easily used to apply a positive signal to the same and to apply to the opposite coil 3 a ground potential or a negative potential.

This is exemplarily summarized in FIG. 12. For example, if the gap behind the coil 3 is at a maximum, i.e. between 3 and 4 or between 3 and 5, as is illustrated in the first column in FIG. 13, the coils 1, 3, 5, 7 are the drive coils. This means that, due to the gap at the stated position, the current in the coils 1, 3 increases and decreases in the coils 5, 7. To now achieve a closed-loop position control, if the closed-loop position control would be performed in the same interval, the follower coil 4 would be set to ground, and the follower coil 8 would be set to $U_M$, or vice versa. Alternatively, the follower coil 4 could be set to ground, and the follower coils 8 could be on $U_M$, or the follower coil 8 could be set to ground and follower coil 4 could be used on $U_M$. The alternative applicable to a motor depends on the winding sense of the coils and the orientation, or magnetization, of the permanent magnets.

In general, according to an aspect, the closed-loop position control is carried out such that, in case of a maximum gap, the polarity is selected as it was in the last drive interval. For example, if the coil 4 was connected positively (with $U_M$) in the last drive interval, the coil 4 is also connected positively (with $U_M$) for the closed-loop position control. Thus, an attraction takes place as well as a reduction of the gap as to the coil 3. However, if the coil 4 was connected negatively (with $-U_M$ or ground) in the last drive interval, the coil 4 is also connected negatively (with $-U_M$ or ground) for the closed-loop position control. This would then also achieve an attraction and reduction of the gap at 3. Vice versa, the opposite coil is then connected in each case, i.e. coil 8 in this case.

Figure 11:
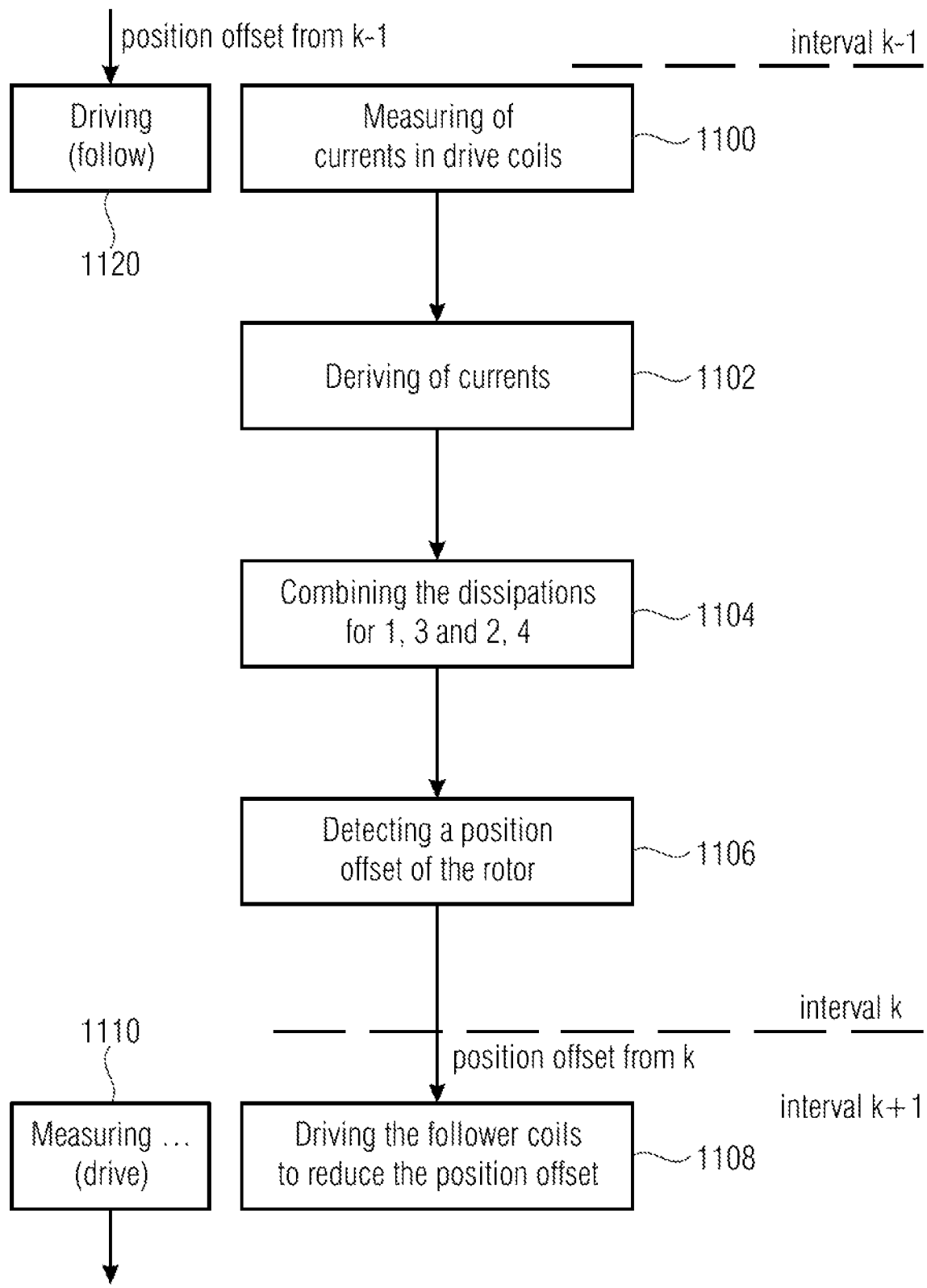
FIG. 11 shows a flow diagram for illustrating the steps performed for the closed-loop position control in an embodiment.

FIG. 11 shows a flowchart for performing various actions executed by the controller 500, e.g. shown in FIG. 5.

The interval k is considered first. Advantageously, a measurement of currents in the drive coils is performed in the interval k, as shown at 1100. To this end, e.g., corresponding current progressions are created, as illustrated in FIG. 7 or FIG. 10. In general, however, it is advantageous to sense a current progression over time, although a first current value at a first time and a second current value, e.g., at a midpoint of the interval would already suffice. Subsequently, in step 1102, the currents are dissipated, e.g. so as to form the values D1 to D7, which have been shown in FIG. 13.

In a step 1104, the dissipations are combined, advantageously for the coils 1, 3 on the one hand and 2, 4 on the other hand, i.e. for opposite coils according to the nomenclature as illustrated in FIG. 3. Considered as a whole and with respect to a nomenclature as illustrated in FIG. 13, coils 1 and 5, and 3 and 7 are opposite coils.

In a step 1106, a detection of a positional offset of the rotor is carried out in order to find out in which direction the rotor is offset. For example, this is done by evaluating the two lines 1310 and 1311 of FIG. 13 in order to be able to draw conclusions from the first two lines or to appropriately drive the follower coils in order to reduce the positional offset, as shown by the last two lines in FIG. 13. For example, if line 1310 has a large positive value and line 1311 has a large negative value, according to the fifth line in FIG. 13, this would result in the coils 2, 6 being driven for the closed-loop position control if the closed-loop position control is performed still in the same interval, or in the coils 1, 2 being driven if the closed-loop position control takes place in the next interval.

Driving of the follower coils is illustrated at 1108 in FIG. 11. If the intervals are large enough or the measurement of only a fraction of the interval is sufficient to determine the rotor offset with a reasonable certainty, the follower coils may be driven in the same interval to reduce the positional offset, as is illustrated at 1108 in FIG. 11. However, if the entire interval is used to perform the steps 1100-1106, the follower coils will be driven in the next interval k+1.

Furthermore, a new measurement takes place in the next interval, as is illustrated at 1110 in FIG. 11. Accordingly, the follower coils are driven after the interval k−1 in the interval k due to the positional offset from the interval k−1, as is illustrated at 1120 in FIG. 11. Thus, when a closed-loop position control each is performed at next interval, the tracking coils of the next interval will be driven on the basis of the positional offset from the previous interval.

Although the present invention has been illustrated with reference to the various figures and in particular to FIG. 1 with four permanent magnets and eight coils, it should be noted that any other combinations of magnets and coils can also be used, as long as the number of permanent magnets is less than the number of coils. Thus, there is a first group of coils electrically connected to each other via a first star point and used for drive control, while a second group of coils electrically connected to each other via a second star point are follower coils. The number of coils in the drive group and the follower group may be 2, but may also be 3, or as is advantageous, may be 4, although even greater numbers of coils are possible.

In embodiments, the approach, in particular with respect to the closed-loop position control, is based on the fact that a current through a coil, at a constantly applied voltage, increases when the gap of the motor facing the coil increases. In the rotational speed control, for example, it is based on the fact that the current for the drive coils may already be switched on and switched off in the preceding time interval in which the drive coils are still follower coils. Thus, the current needed for a drive coil may be maintained from the start of the time interval to the end of the time interval, since the current may then be switched on or off in the previous or subsequent time interval where the current is still only the follower coil, without affecting the motor behavior. Therefore, it is also irrelevant whether the current through the coil is completely switched off, i.e., switched to zero, or is left at a certain level, in the following interval, i.e. in the interval where a coil is the follower coil.

Particularly for switching the current off, in an embodiment of the present invention in which switches are used as shown in FIG. 4 and FIG. 6, respectively, the corresponding coil is disconnected from the potential, e.g. by the switch S41 for the coil 304, while at the same time the switch S42 is closed. Alternatively, the switch S42 could also be left open. Still, there is a current equalization and a corresponding discharge of the coils, i.e. particularly via the freewheeling diodes, which ensure that potentials do not fluctuate to a large extent, but are kept within tolerable limits by the functionality of the freewheeling diode. It is also particularly advantageous that, by the switch off in the interval in which the coil does not contribute to the drive, no current has to be routed through a resistor and is therefore converted into heat. Instead, there is a current flow between the coils on the one hand and the power supply on the other, and in particular a smoothing capacitor in the power supply. This ensures that any energy stored in the coils, which is no longer required, when the coil is in the follower mode, is released to the power supply, and supplied from there in the next cycle. This means that there is no loss of energy, but that there is only an energy oscillation from the motor to the power supply and vice versa, which leads to the cooling requirements in particular being reduced and power requirements being as low as possible.

As to the closed-loop position control, it should be noted that it takes place in a qualitative or advantageously even in a quantitative manner. In particular, proportional closed-loop control is advantageous. For this purpose, a certain current may be applied to the coils, e.g., as determined on the basis of FIG. 13 in the last two lines. However, it is advantageous to apply the same reference voltage $U_M$ for the closed-loop position control, and to accordingly only control the corresponding switches, as exemplarily illustrated in FIG. 6. For this purpose, it is advantageous to apply corresponding time progressions to the switches, in order to be ultimately driven as a function of a certain measured offset that depends on the quantitative values determined in lines 1310, 1311.

Depending on the corresponding rotational speed, intervals in the range of microseconds will suffice here. For example, if a rotational speed needed is 2000 revolutions per second, corresponding to about 120.000 revolutions per minute, a rotational cycle has the length of 62.5 microseconds. In such a cycle, e.g., which is divided into four intervals, with each interval being about 15 microseconds, it is sufficient for small to medium deviations to apply the reference potential $U_M$ of FIG. 6 for 1 to 3 us in the follower interval with an appropriate switch setting in the following interval so as to achieve the closed-loop position control.

Furthermore, it should also be noted that, in particular, the closed-loop position control may be used for motors using magnetic bearings that do not have contact bearings, such as ball or roller bearings. Furthermore, such motors using magnet bearings are advantageously designed as disc motors that are stable along the axial direction of the axis of rotation, but are to be closed-loop controlled along the radial direction, i.e. with respect to the offset of the rotor relative to the stator in the radial direction. However, the rotational speed control may just as well be implemented with motors configured with contact bearings, there is no need for a magnetic bearing so as to implement the rotational speed control in connection with two coil groups with different star points and different driving groups.

Figure 14:
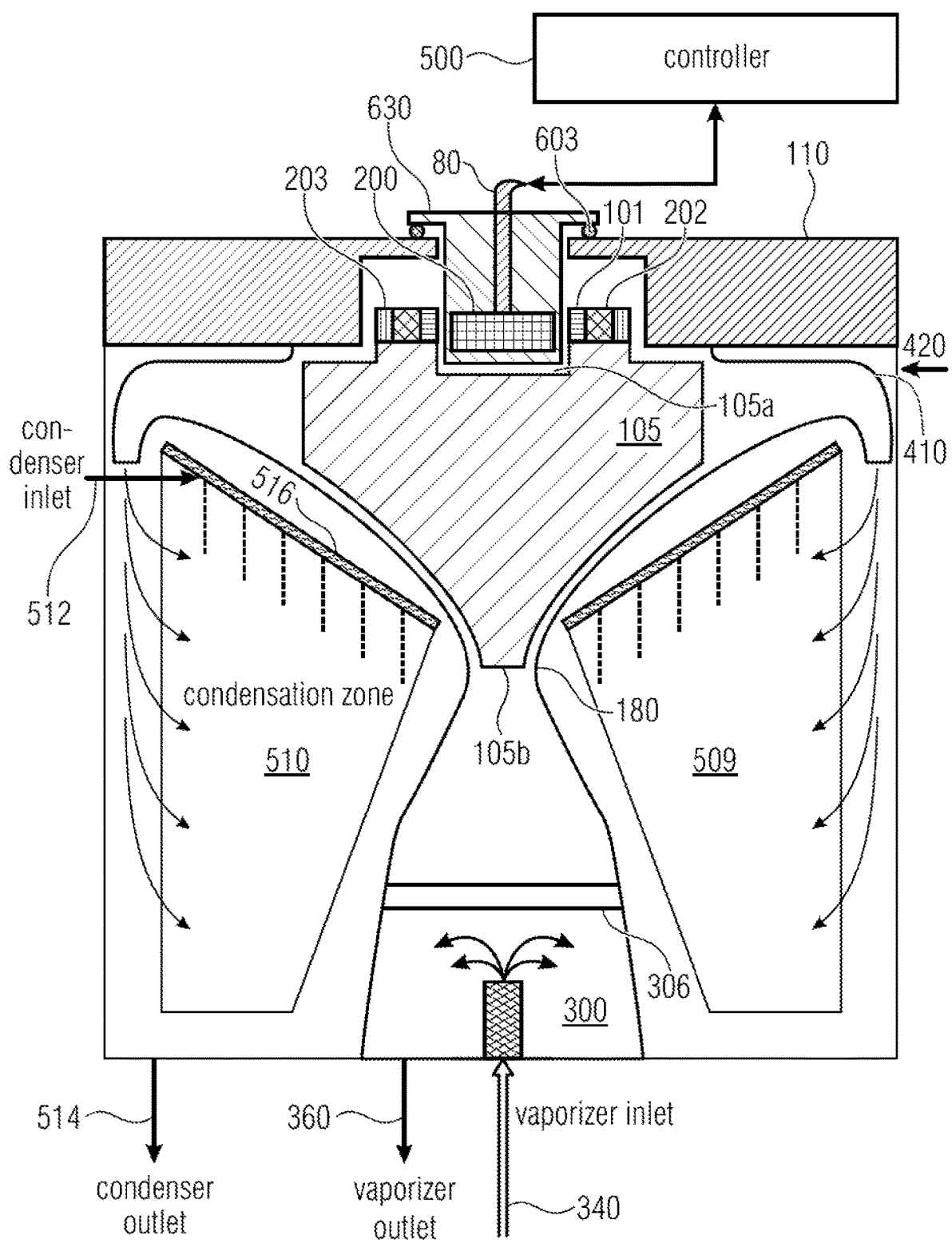
FIG. 14 shows a schematic cross section for a heat pump with an inventive electric motor comprising the two star points.

FIG. 14 shows an advantageous application of the disc armature motor, i.e. an electric motor with a disc-shaped rotor, in the example of a heat pump. The heat pump includes an evaporator 300, a compressor 420, and a condenser 509, the compressor 420 comprising the electric disc armature motor, described with reference to FIGS. 1A-5.

In addition to the elements of the disc armature motor exemplarily illustrated with reference to one of the previous figures, the compressor further includes a guide chamber 410 radially arranged to convey the working steam, drawn by the evaporator 300, conveyed by the element 105 to be moved and to ultimately increase the pressure to the pressure needed in the condensation zone 510 in the condenser 509.

Liquid to be cooled flows into the evaporator via an evaporator inlet 340. Cooled working liquid flows out of the evaporator via an evaporator outlet 360. To ensure that the radial impeller 105 draws in only vapor and does not draw in water droplets in addition to a vapor, a droplet separator 306 is also provided. Due to the low pressure in the evaporator inlet 300, a portion of the working fluid introduced into the evaporator 300 via the evaporator inlet 340 is vaporized and drawn through the droplet separator 306 via the second side 105b of the radial impeller 105 and conveyed upward and then discharged into the guide chamber 510. Compressed working scheme is brought from the guide chamber 510 to the condensation zone 510. The condensation zone 510 is further supplied with working fluid to be heated via a condenser inlet 512, heated by condensation with the heated steam, and discharged via a condenser outlet 514. Advantageously, the condenser is configured as a condenser in the form of a "shower" so that a distribution of liquid in the condensation zone 510 is achieved via a distributor 516. In this way, the compressed working steam is condensed as efficiently as possible and the heat contained therein is transferred to the liquid in the condenser.

In the embodiment shown in FIG. 14, a motor housing 110 that at the same time also forms the upper housing part of the condenser, or liquefier 509, is drawn in. Furthermore, a connection line 80 for the coils of the stator 200 is connected to a controller 600 in order to carry out the corresponding rotational speed controls and at the same time also the active support via a advantageously used magnetic bearing, as has been described with reference to FIG. 7. Thus, the controller additionally provides the functions of radial sensing 270 and radial control/closed-loop control 280.

In addition, FIG. 14 shows an implementation in which the disc armature motor includes a solid block 630 of an encapsulant that is sealed with respect to the motor housing 110 via a sealing ring 603 so that there is a pressure-tight separation between the exterior and the interior. Both the coil holder and the coils are surrounded by an encapsulation material, shown in FIG. 14 as being integral with the solid block 630. However, this does not necessarily have to be the case. However, it is advantageous to a provide separation by means of the encapsulation material extending into the motor gap such that the coils are not located in the low pressure region within the motor housing.

Further, in the embodiment shown in FIG. 14, the stator is arranged in a recess defined by an upper side 105a. In other embodiments, the rotor may be configured without a recess, so that the area made of a magnet 101, a return element 202, and a band 203, as is shown in FIG. 14, is placed on a radial wheel formed to be flat on its top.

It is further apparent from FIG. 14 that the element connected to the rotor 10 and to be moved is the radial impeller, or paddle wheel, 105, which is to compress and thus to heat the working steam conveyed by the evaporator in cooperation with the guide path 410 so that the heat is pumped from the evaporator to the condenser.

Advantageously, the rotor is supported with respect to the stator by a magnetic bearing and the rotor is held axially with respect to the stator due to the permanent magnets on the rotor side and the electric coils on the stator side, and is not specifically closed-loop controlled. A radial sensing device as well as a radial control/closed-loop control device 500 are provided. The radial detection device detects the position of the rotor with respect to the stator or vice versa. The result of the radial detection is communicated via a sensor line to a radial control/closed-loop control device. The same generates the actuator signals accordingly via actuator signal lines on the rotor or the stator, depending on the implementation. The coils are driven to position the rotor with respect to the stator on the basis of the actuator signal, such that the motor gap has a similar size around the entire rotor and the rotor does not touch the stator.

In an embodiment, the rotor is arranged on the inside and the stator is arranged on the outside. Therefore, this is an inrunner, in contrast to FIG. 1, for example. In principle, however, the magnet bearing in the example of a reluctance bearing is similar in both cases, in that an axial closed-loop control does not take place, while a radial closed-loop control takes place through the radial sensing device and the radial control/closed-loop control device.

Although certain elements are described as apparatus elements, it is to be noted that this description is equally to be regarded as a description of steps of a method and vice versa.

It should further be noted that a control, e.g., performed by the element 500 may be implemented as software or hardware. The implementation of the control may be carried out on a non-volatile storage medium, a digital or other storage medium, in particular a floppy disc, or a CD with electronically readable control signals, which may interact with a programmable computer system in such a way as to execute the corresponding method for operating a heat pump. In general, the invention therefore also includes a computer program product with a program code stored on a machine-readable carrier to perform the method if the computer program product runs on a computer. In other words, the invention may also be realized as a computer program having a program code for performing the method if the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

LIST OF REFERENCE NUMERALS 80 connection line
100 rotor
101, 102, 103, 104 permanent magnets
105 area to be rotated (e.g. radial impeller)
105a upper side of the radial impeller
105a lower side of the radial impeller
110 motor housing
200 stator
202 magnetic return element
203 band
300 evaporator
301, 302, 303, 304 drive coils
306 droplet dispenser
321, 322, 323, 324 second group of coils
311 first star point SP1
331 second star point SP2
340 evaporator inlet
360 evaporator outlet
400 reference potential UN
401 first switch
402 second switch
410 guide chamber
420 compressor
500 control
501 first star point group
502 second star point group
509 condenser
510 condensation zone
512 liquefier inlet
514 liquefier outlet
516 liquefier distributor 600 reference node
601 ground node
602 reference potential connection node
603 sealing ring
604, 605, 606, 607 intermediate node
611, 612, 613, 614 freewheeling diodes
621, 622, 623, 624 current sensors
630 stator block
700 interval
705 switch-on time
706 switch-on time
707 switch-on time
901 first closed-loop position control direction
902 second closed-loop position control direction
1100 measuring of currents
1102 dissipating the currents
1104 combining the dissipations
1106 detecting
1108 driving the follower coils
1110 measuring in the interval k+1
1120 driving in the interval k
1300, 1301, 1302 column of FIG. 13
1310, 1311 lines of FIG. 13
The invention claimed is:

1. Electric motor, comprising:
a rotor with a first number of permanent magnets, wherein each permanent magnet encompasses a first sector;
a stator with a second number of pole feet, wherein a coil is wound around each pole foot of the second number of pole feet, and wherein a pole foot encompasses a second sector that is smaller than the first sector,
wherein the electric motor is configured so that a first group of coils is electrically connected via a first star point,
wherein the electric motor is configured so that a second group of coils is electrically connected via a second star point to be conductive,
wherein the electric motor is configured so that the second star point is electrically insulated from the first star point,
wherein a coil of the first group of coils is arranged between two coils of the second group of coils;
a plurality of controllable switches; and
a controller configured for applying drive signals to the first group of coils so as to provide the rotor with a torque with respect to the stator, and configured for applying a control signal that differs from the drive signals to at least one coil of the second group of coils,
wherein each coil of the first and second groups of coils comprises two connections, wherein one connection each of each coil is connected to the first and the second star point, respectively, and
wherein the respectively other connection of each coil is connected to the controllable switch, wherein the controllable switch is configured to, as a function of a control signal of the control, connect the other connection of each coil to a positive reference potential, a negative reference potential, or a ground potential, or to switch the same into a no-load operation, and
wherein the controller is configured to connect the coils of the first group either with the positive reference potential or the negative reference potential or the ground potential in the first interval, and to switch at least one of the coils of the second group into the no-load operation in the first interval, or to connect the coils of the second group either with the positive reference potential or the negative reference potential or the ground potential at a later second interval so as to exert a torque to the rotor in the second interval.

2. Electric motor according to claim 1, wherein the controller is configured to apply the drive signals to the first group of coils in a first internal, and to apply drive signals to the second group of coils in a later second interval so as to provide the rotor with a torque with respect to the stator in the second interval.

3. Electric motor according to claim 1,
wherein the pole feet wound around the coils are arranged in a circular arrangement, wherein each pole foot encompasses a circular sector, and
wherein one coil each of the other group is arranged between two coils of one group.

4. Electric motor according to claim 1,
wherein each coil either belongs to the first group or to the second group and no coil belongs to both groups.

5. Electric motor according to claim 1,
wherein the controller is configured to apply different potentials to neighboring coils in a group when the group is driven in an interval in which the rotor is provided with the torque by the coils of the second group.

6. Electric motor according to claim 1,
wherein the first group comprises four coils, and wherein the second group comprises four coils,
wherein the rotor comprises four permanent magnet portions that are magnetized differently, and
wherein the controller is configured to apply in one interval different voltages as the drive signals to two adjacent coils of the first group, or to apply the same voltage as the drive signals to two opposite coils of the first group.

7. Electric motor according to claim 1,
wherein the controller is configured to drive the first group of coils with the drive signals in a first interval, and to drive the second group of coils with the drive signals in a second interval, and
wherein the controller is configured to switch the second group of coils to a ground potential or to a no-load operation at a start of the first interval after the end of the preceding interval, and to switch on a voltage supply of the coils of the second group of coils at a switch-on time before an end of the first interval, namely by using for the voltage supply a voltage value that is provided for the second interval in which the second group of coils is driven with the drive signals.

8. Electric motor according to claim 7,
wherein the controller is configured to set the switch-on time as a function on a presettable rotational speed with respect to the start of the second interval.

9. Electric motor according to claim 7,
wherein the controller is further configured to set the switch-on time to be earlier with respect to the end of the first interval so as to increase a rotational speed, or to set the switch-on time to be later with respect to the end of the first interval so as to decrease the rotational speed.

10. Electric motor according to claim 1,
wherein the controller comprises a first control unit configured for solely controlling the first group of coils, and a second control unit configured for solely controlling the second group of coils, wherein each control unit of the first control unit and the second control unit comprises its own reference potential or its own ground potential.

11. Electric motor according to claim 10,
wherein the plurality of controllable switches comprises two controllable switches per coil,
wherein the first control unit and the second control unit, respectively, comprise the two controllable switches per coil, wherein a first controllable switch of the two controllable switches per coil is connected between the reference potential of the control unit and a connection of the corresponding coil that is not connected to the star point, and
wherein a second controllable switch of the two controllable switches is connected between the connection of the corresponding coil and the ground potential of the corresponding control unit, wherein the second controllable switch is further bypassed by a freewheeling diode, wherein the controller is configured to open or to close the two controllable switches, or to increase or to decrease the reference potential.

12. Electric motor according to claim 1, comprising a plurality of sensors,
wherein each sensor of the plurality of sensors is allocated to a coil of the first group of coils and configured to sense the current through the coil due to a drive signal for the coil,
wherein the controller is configured
to determine, as a function of sensor signals of the sensors of the first group of coils, a position or a positional deviation from a central position of the rotor, and
to apply, as a function of the position or the positional deviation, a closed-loop position control signal to a coil of the second group of coils in the first interval, or to a coil of the first group in a second interval following the first interval so as to reduce or eliminate the positional deviation from the central position.

13. Electric motor according to claim 1,
wherein the controller is configured to sense an induced current in at least one coil of the first group of coils due to a radial offset of the rotor with respect to the stator, and to apply to at least one coil of the first or second group of coils a position variation signal configured such that the offset is reduced or eliminated.

14. Electric motor according to claim 1, wherein the controller is configured
to sense a current or a variation of the current in a coil of the first group of coils,
to determine from the current or the variation of the current and a position of the respective coil an indication as to a direction of the offset, and
to apply, as a function of the indication about the offset, a signal to one or two coils of the first group of coils or the second group of coils so as to reduce the offset, while the controller controls the first group of coils, or
to apply to determined coils of the first group, while the controller drives the second group with drive signals in a later interval.

15. Electric motor according to claim 1,
wherein the controller is configured
to sense temporal progressions of currents in the first group of coils due to voltages applied as drive signals,
to determine variations of the temporal progressions of the currents,
to differently combine determined variations of the temporal progressions so as to acquire at least one sensing signal, and
wherein the controller is configured to apply to at least one coil of the second group of coils, as a control signal, a position variation signal that depends on the at least one sensing signal.

16. Electric motor according to claim 15,
wherein the first group of coils comprises four coils arranged at the stator such that coil axes comprise an angle of between 80° and 100° relative to each other,
wherein the controller is configured to combine the dissipations of two coils comprising an angle between 160 and 200° relative to each other so as to acquire two sensing results each,
wherein the controller is configured to evaluate different states of the sensing signals so as to determine at least four different maximum and minimum gap positions, respectively,
wherein the controller is configured to select, as a function of the evaluated at least two sensing results, one or two closed-loop position control coils to which a positive potential is applied, while a negative potential is applied to at least one other closed-loop position control coil, and
wherein the controller is configured to apply the closed-loop position control potentials such that current flows in the same direction through opposite closed-loop position control coils, or such that current does not flow through opposite closed-loop position control coils.

17. Electric motor according to claim 1,
wherein the motor is configured as a disc motor, and
wherein the rotor and the stator, respectively, comprise a radial expansion with respect to a rotation axis of the motor that is larger than or equal to twice the axial expansion.

18. Electric motor according to claim 1,
wherein the electric motor comprises a magnetic bearing and does not comprise a contact bearing.

19. Method for manufacturing an electric motor comprising a rotor with a first number of permanent magnets, wherein each permanent magnet encompasses a first sector; a stator with a second number of pole feet, wherein a coil is wound around each pole foot of the second number of pole feet, and wherein a pole foot encompasses a second sector that is smaller than the first sector, comprising:
electrically connecting a first group of coils via a first star point,
electrically connecting a second group of coils via a second star point, wherein the second star point is electrically insulated from the first star point, wherein a coil of the first group of coils is arranged between two coils of the second group of coils; and
connecting a controller to the coils of the first and the second group for applying drive signals to the first group of coils so as to provide the rotor with a torque with respect to the stator, and for applying a control signal that differs from the drive signals to at least one coil of the second group of coils,
wherein each coil of the first and second groups of coils comprises two connections, wherein one connection each of each coil is connected to the first and the second star point, respectively, and
wherein the respectively other connection of each coil is connected to a controllable switch, wherein the controllable switch is configured to, as a function of a control signal of the control, connect the other connection of each coil to a positive reference potential, a negative reference potential, or a ground potential, or to switch the same into a no-load operation, and wherein the controller is configured to connect the coils of the first group either with the positive reference potential or the negative reference potential or the ground potential in the first interval, and to switch at least one of the coils of the second group into the no-load operation in the first interval, or to connect the coils of the second group either with the positive reference potential or the negative reference potential or the ground potential at a later second interval so as to exert a torque to the rotor in the second interval.

20. Method for operating an electric motor comprising a rotor with a first number of permanent magnets, wherein each permanent magnet encompasses a first sector; a stator with a second number of pole feet, wherein a coil is wound around each pole foot of the second number of pole feet, and wherein a pole foot encompasses a second sector that is smaller than the first sector, wherein a first group of coils is electrically connected via a first star point, wherein a second group of coils is electrically connected via a second star point to be conductive, wherein the second star point is electrically insulated from the first star point, wherein a coil of the first group of coils is arranged between two coils of the second group of coils, comprising:

applying drive signals to the first group of coils so as to provide the rotor with a torque with respect to the stator; and applying a control signal that differs from the drive signals to at least one coil of the second group of coils, wherein each coil of the first and second groups of coils comprises two connections, wherein one connection each of each coil is connected to the first and the second star point, respectively, and wherein the respectively other connection of each coil is connected to a controllable switch, wherein the controllable switch is configured to, as a function of a control signal of the control, connect the other connection of each coil to a positive reference potential, a negative reference potential, or a ground potential, or to switch the same into a no-load operation, and wherein the controller is configured to connect the coils of the first group either with the positive reference potential or the negative reference potential or the ground potential in the first interval, and to switch at least one of the coils of the second group into the no-load operation in the first interval, or to connect the coils of the second group either with the positive reference potential or the negative reference potential or the ground potential at a later second interval so as to exert a torque to the rotor in the second interval.

* * * * *